US010313561B2

(12) United States Patent
Sawada

(10) Patent No.: US 10,313,561 B2
(45) Date of Patent: Jun. 4, 2019

(54) IMAGE PROCESSING APPARATUS THAT EXECUTES COLOR CONVERSION ON OBJECT DATA IN TARGET FILE

(71) Applicant: BROTHER KOGYO KABUSHIKI KAISHA, Nagoya, Aichi (JP)

(72) Inventor: Kazuhide Sawada, Nagoya (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 70 days.

(21) Appl. No.: 15/404,240

(22) Filed: Jan. 12, 2017

(65) Prior Publication Data

US 2017/0208216 A1 Jul. 20, 2017

(30) Foreign Application Priority Data

Jan. 15, 2016 (JP) .................................. 2016-006509

(51) Int. Cl.
*G06F 15/00* (2006.01)
*H04N 1/60* (2006.01)
*H04N 1/00* (2006.01)

(52) U.S. Cl.
CPC ....... *H04N 1/6008* (2013.01); *H04N 1/00408* (2013.01); *H04N 1/603* (2013.01); *H04N 1/6072* (2013.01); *H04N 2201/0082* (2013.01)

(58) Field of Classification Search
CPC ............. H04N 1/6008; H04N 1/00408; H04N 1/40018

USPC ........................................................ 358/518
See application file for complete search history.

(56) References Cited

U.S. PATENT DOCUMENTS

2009/0092316 A1* 4/2009 Matsuzaki ............. H04N 1/603
382/167

FOREIGN PATENT DOCUMENTS

JP 2002-182634 A 6/2002
JP 2014-120886 A 6/2014

* cited by examiner

*Primary Examiner* — Mark R Milia
(74) *Attorney, Agent, or Firm* — Scully, Scott, Murphy & Presser, P.C.

(57) ABSTRACT

A target file includes: object data including pixels indicative of coordinate values in a first color space; and an input-side profile including data for converting coordinate values from the first color space into a specific color space. A color conversion is executed onto object data to generate post-conversion data including pixels indicative of coordinate values in a second color space. The executing color conversion includes executing judgment to judge, based on the input-side profile, which of first type post-conversion data generated through first type conversion using the input-side profile and an output-side profile, and second type post-conversion data generated through second-type conversion using prescribed data, should be used to output an image of the target file. The prescribed data is for conversion from the first color space into the second color space. The output-side profile contains data for conversion from the specific color space into the second color space.

16 Claims, 12 Drawing Sheets

FIG. 4
(FIRST EMBODIMENT)
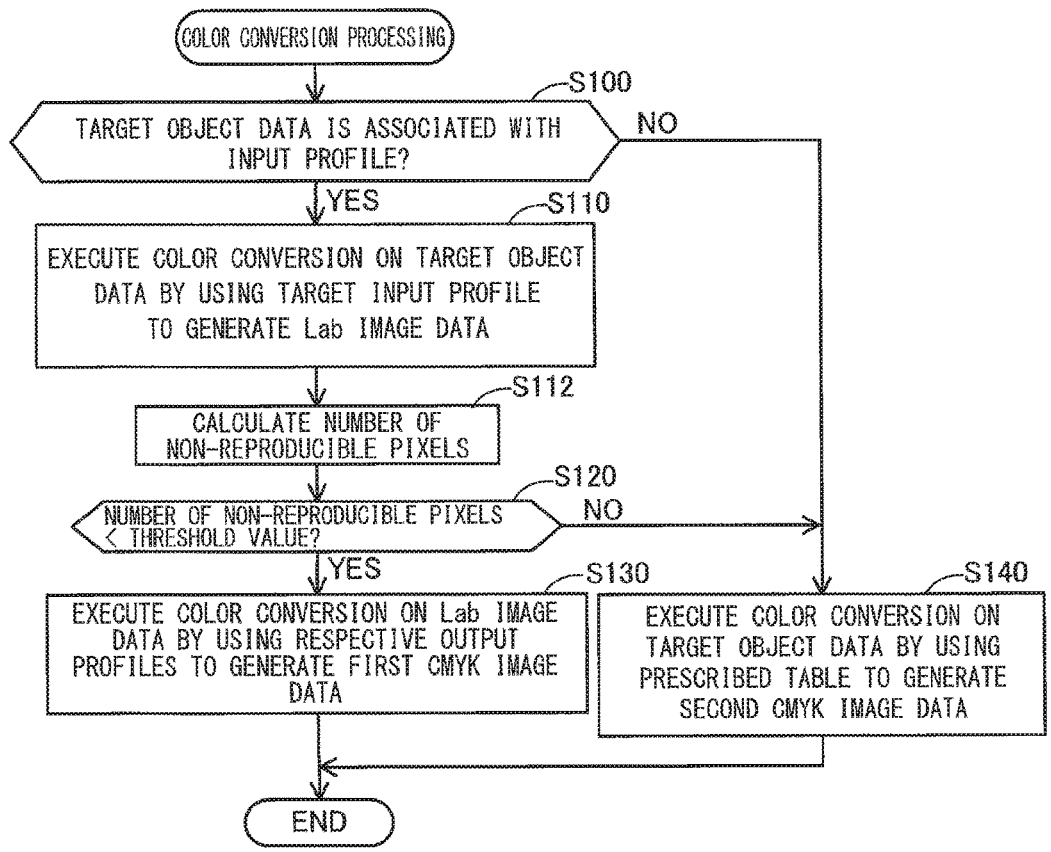
(EXAMPLE OF PROCESSING FLOW)
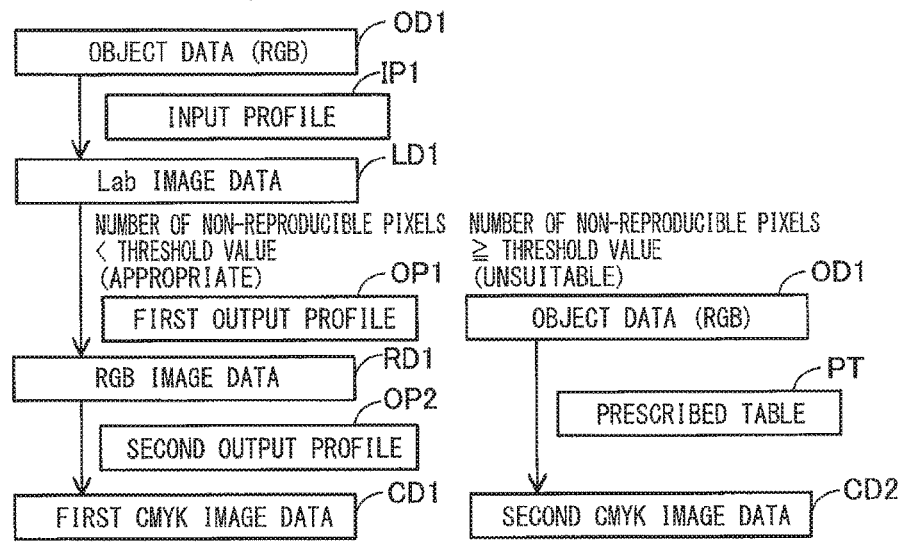

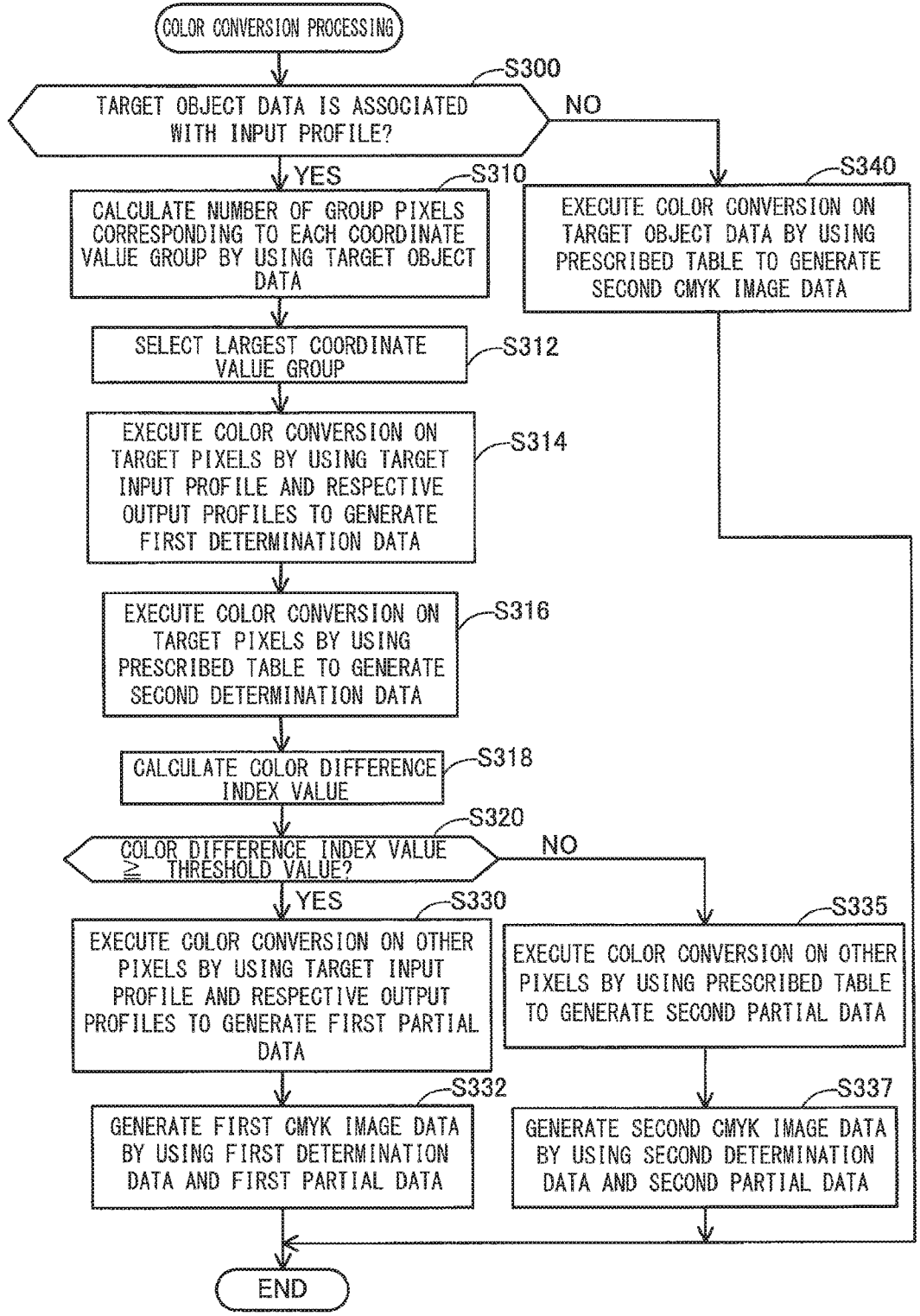

FIG. 8

(THIRD EMBODIMENT)
(EXAMPLE OF PROCESSING FLOW)
   TOTAL OF 64 COORDINATE VALUE GROUPS

FIRST GROUP
$(0 \leq R \leq 63, 0 \leq G \leq 63, 0 \leq B \leq 63)$

OBJECT DATA (RGB) — OD1

↓

NUMBER OF GROUP PIXELS CORRESPONDING TO EACH OF 64 COORDINATE VALUE GROUPS
(FIRST GROUP: G1 NUMBER OF PIXELS, SECOND GROUP: G2 NUMBER OF PIXELS, ⋯)

↓

SELECT FIRST GROUP AS LARGEST COORDINATE VALUE GROUP

↓

TARGET PIXELS (RGB) CONTAINED IN FIRST GROUP WITHIN OBJECT DATA OD1

INPUT PROFILE — IP1
RESPECTIVE OUTPUT PROFILES — OP1, OP2
PRESCRIBED TABLE — PT

FIRST DETERMINATION DATA (CMYK) — DD1     SECOND DETERMINATION DATA (CMYK) — DD2

COLOR DIFFERENCE INDEX VALUE $= \{ \Sigma \sqrt{((C1-C2)^2 + (M1-M2)^2 + (Y1-Y2)^2 + (K1-K2)^2)} \}$ / (NUMBER OF PIXELS)

(COLOR DIFFERENCE INDEX VALUE ≥ THRESHOLD VALUE) (APPROPRIATE)
(COLOR DIFFERENCE INDEX VALUE < THRESHOLD VALUE) (UNSUITABLE)

↓

PIXELS (RGB) CONTAINED IN OTHER GROUPS WITHIN OBJECT DATA OD1

INPUT PROFILE — IP1
RESPECTIVE OUTPUT PROFILES — OP1, OP2
PRESCRIBED TABLE — PT

FIRST PARTIAL DATA (CMYK) — PD1     SECOND PARTIAL DATA (CMYK) — PD2

↓

FIRST CMYK IMAGE DATA — CD1     SECOND CMYK IMAGE DATA — CD2

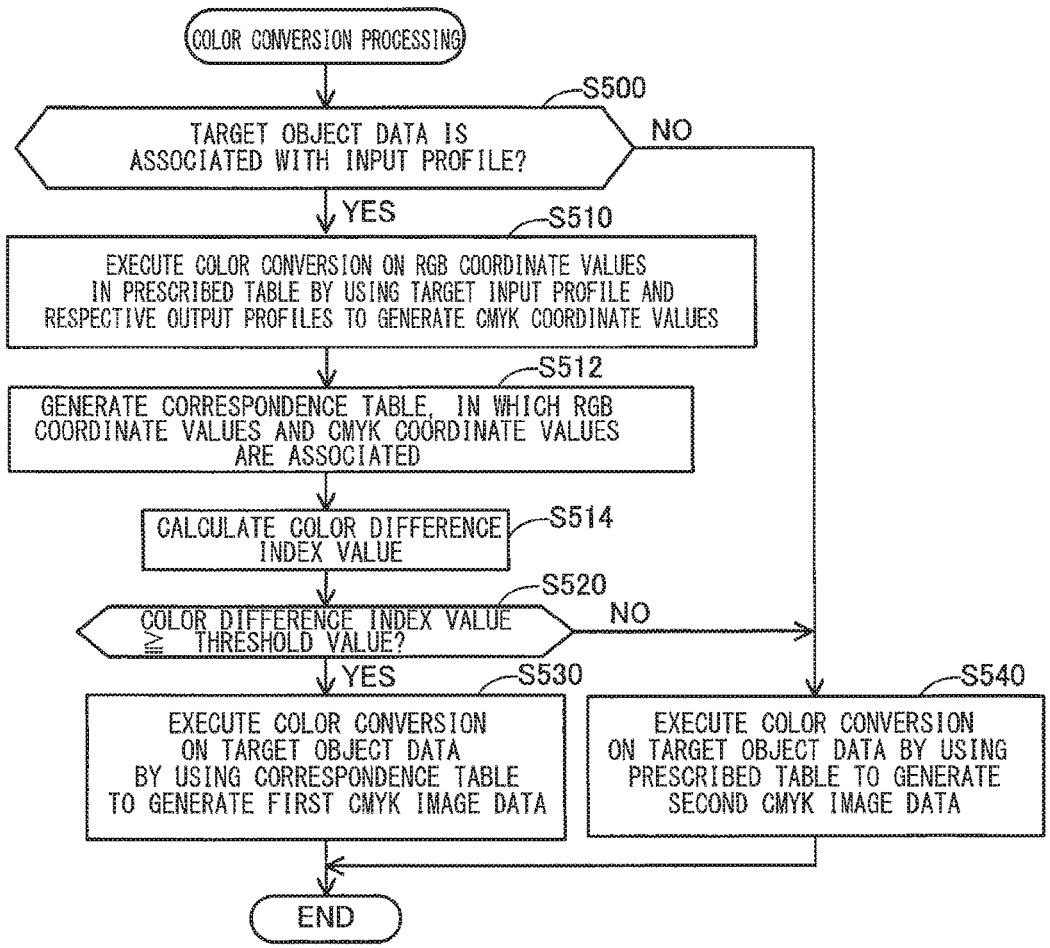
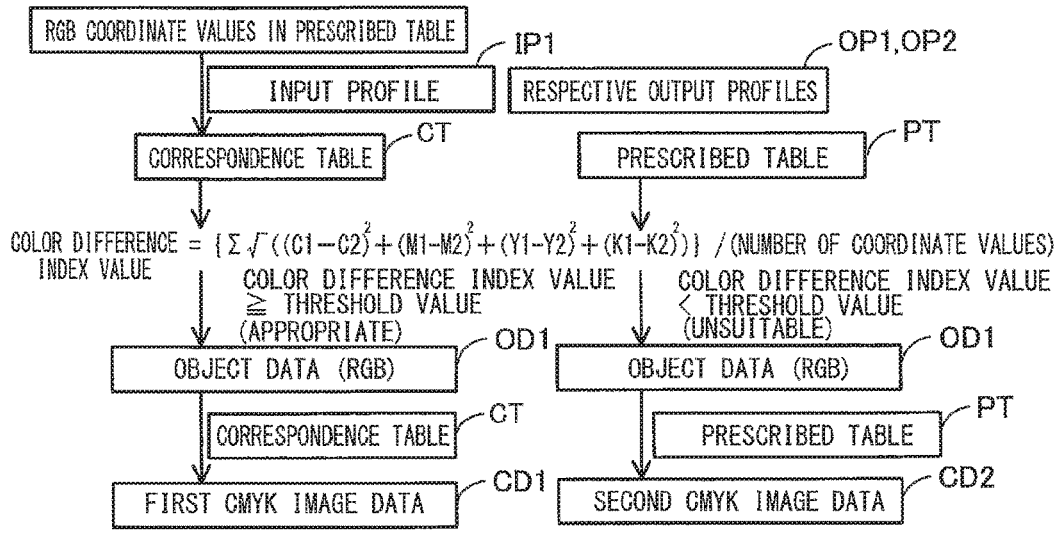
FIG.11

IMAGE PROCESSING APPARATUS THAT EXECUTES COLOR CONVERSION ON OBJECT DATA IN TARGET FILE

CROSS REFERENCE TO RELATED APPLICATION

This application claims priority from Japanese Patent Application No. 2016-006509 filed Jan. 15, 2016. The entire content of the priority application is incorporated herein by reference.

TECHNICAL FIELD

The present disclosure relates to an image processing apparatus that outputs an image represented by a target file by executing color conversion on object data included in the target file.

BACKGROUND

There has been conventionally proposed such a color reproduction processing switching apparatus that divides a target image to be displayed into a plurality of blocks, and changes a color reproduction processing method applied to each block in accordance with the characteristics of the each block. For example, the color reproduction processing switching apparatus applies a high-speed color reproduction processing method to those block that indicates a mountain expressed by a single color, and applies a high-definition color reproduction processing method to those block that indicates a human face.

SUMMARY

There is a demand for output of a high-quality image. In the above-described conventional apparatus, however, the color reproduction processing method is selected dependent on the contents of an image to be displayed. This conventional technique may, however, fail to output a high-quality image.

It is therefore an object of the disclosure to provide an improved image processing apparatus that can output a high-quality image.

According to one aspect, an image processing apparatus includes: a memory; and a control device. The memory is configured to store prescribed data and an output-side profile. The prescribed data is for converting coordinate values defined in a first color space into coordinate values defined in a second color space. The output-side profile contains data for converting coordinate values defined in a specific color space into coordinate values defined in the second color space. The control device is configured to perform:

acquiring a target file in a state that the prescribed data and the output profile are stored in the memory, the target file including object data and an input-side profile, the object data including a plurality of pixels indicative of coordinate values defined in the first color space, the input-side profile including data for converting the coordinate values in the first color space into coordinate values in the specific color space;

executing a color conversion process onto the object data to generate post-conversion data, the post-conversion data including a plurality of pixels indicative of coordinate values defined in the second color space, the executing the color conversion process including executing a judgment to judge, based on the input-side profile, which of first type post-conversion data and second type post-conversion data should be used to output an image represented by the target file, the first type post-conversion data being generated through a first type color conversion, the second type post-conversion data being generated through a second type color conversion, the first type color conversion being a color conversion that uses the input-side profile and the output-side profile, the second type color conversion being a color conversion that uses the prescribed data; and controlling an output device to output the image represented by the target file based on the post-conversion data, the post-conversion data being either one of the first type post-conversion data and the second type post-conversion data that is determined dependently on a result of the judgment.

According to another aspect, a non-transitory computer readable storage medium stores a set of program instructions for an image processing apparatus. The image processing apparatus includes: a memory; and a computer. The memory is configured to store prescribed data and an output-side profile. The prescribed data is for converting coordinate values defined in a first color space into coordinate values defined in a second color space. The output-side profile contains data for converting coordinate values defined in a specific color space into coordinate values defined in the second color space; and a computer. The program instructions, when executed by the computer, cause the image processing apparatus to perform:

acquiring a target file in a state that the prescribed data and the output profile are stored in the memory, the target file including object data and an input-side profile, the object data including a plurality of pixels indicative of coordinate values defined in the first color space, the input-side profile including data for converting the coordinate values in the first color space into coordinate values in the specific color space;

executing a color conversion process onto the object data to generate post-conversion data, the post-conversion data including a plurality of pixels indicative of coordinate values defined in the second color space, the executing the color conversion process including executing a judgment to judge, based on the input-side profile, which of first type post-conversion data and second type post-conversion data should be used to output an image represented by the target file, the first type post-conversion data being generated through a first type color conversion, the second type post-conversion data being generated through a second type color conversion, the first type color conversion being a color conversion that uses the input-side profile and the output-side profile, the second type color conversion being a color conversion that uses the prescribed data; and controlling an output device to output the image represented by the target file based on the post-conversion data, the post-conversion data being either one of the first type post-conversion data and the second type post-conversion data that is determined dependently on a result of the judgment.

BRIEF DESCRIPTION OF THE DRAWINGS

The particular features and advantages of the disclosure will become apparent from the following description taken in connection with the accompanying drawings, in which:

FIG. 4 illustrates a flowchart of a color conversion processing shown in FIG. 3, and illustrates an example of a flow of the color conversion processing;

FIG. 7 illustrates a flowchart of the color conversion processing according to a third embodiment;

FIG. 8 illustrates an example of a flow of the color conversion processing according to the third embodiment;

FIG. 11 illustrates a flowchart of the color conversion processing according to the fifth embodiment, and illustrates an example of a flow of the color conversion processing.

DETAILED DESCRIPTION

Figure 1:
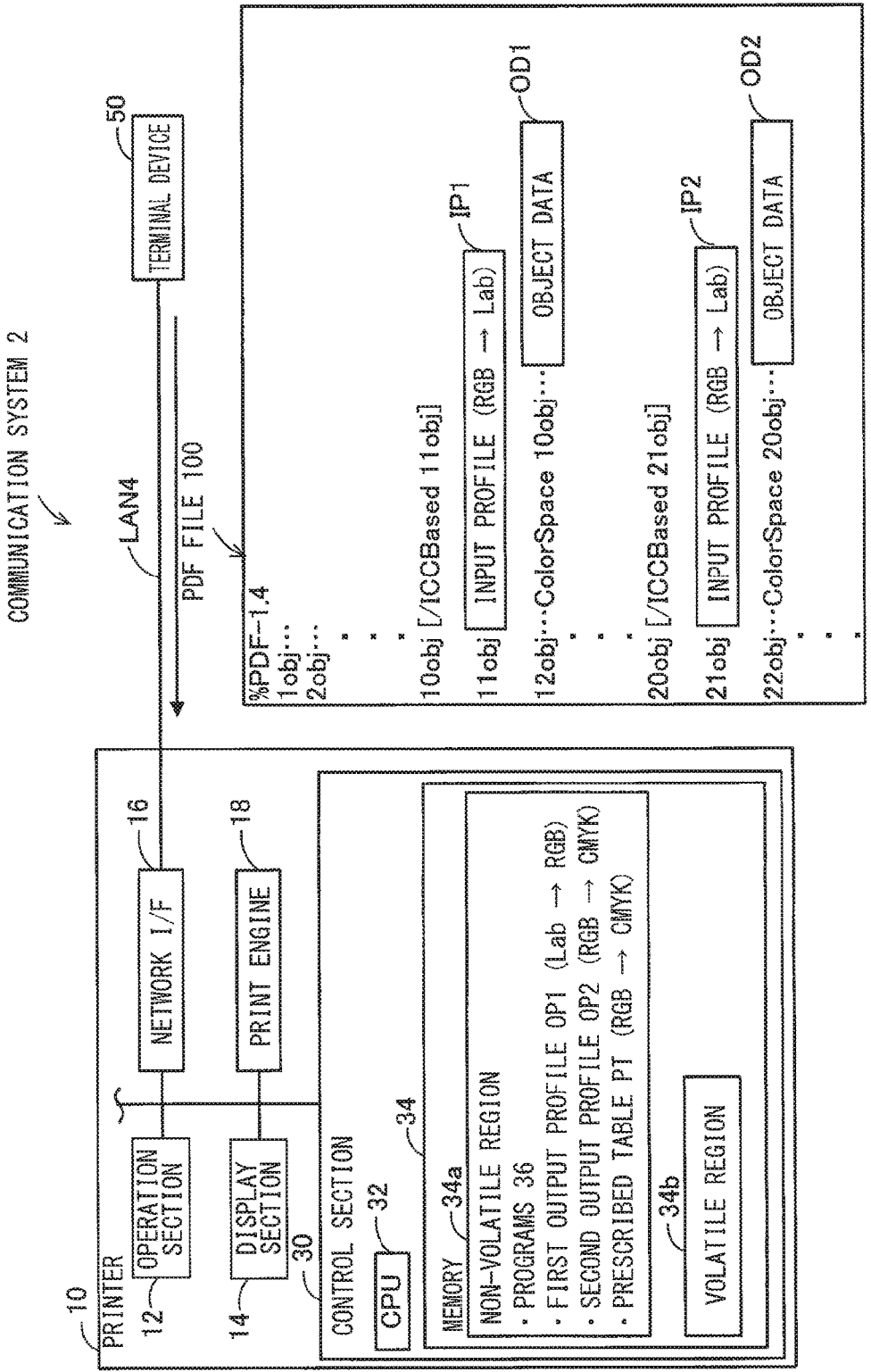
FIG. 1 shows a configuration of a communication system according to a first embodiment.

An image processing apparatus according to a first embodiment will be described while referring to the accompanying drawings wherein like parts and components are designated by the same reference numerals to avoid duplicating description.

First Embodiment

Configuration of Communication System 2

As shown in FIG. 1, a communication system 2 according to a first embodiment includes a printer 10 and a terminal device 50. The printer 10 and the terminal device 50 are connected to a local area network (LAN) 4, and can communicate with each other through the LAN 4. The LAN 4 may be a wired LAN or a wireless LAN. For example, when a portable document format (PDF) file 100 is supplied from the terminal device 50 to the printer 10 through the LAN 4, the printer 10 can print an image in the PDF file 100.

Configuration of Printer 10

The printer 10 is a peripheral device for the terminal device 50 and the like. The printer 10 can execute a print function. The printer 10 includes an operation section 12, a display section 14, a network interface (network I/F) 16, a print engine 18, and a control section 30. The respective sections 12 to 30 are connected to a bus (with no reference numeral). The operation section 12 is configured with a plurality of keys. The user can input a variety of instructions to the printer 10 by operating the operation section 12. The display section 14 is a display for showing a variety of sets of information. The display section 14 also serves as a touch panel. That is, the display section 14 also functions as an operation section to be operated by the user. The network interface 16 is connected to the LAN 4. The print engine 18 includes a print mechanism of an inkjet type, a laser type, or the like.

The control section 30 includes a CPU 32 and a memory 34. The CPU 32 executes various sets of processing in accordance with programs 36 stored in the memory 34. The memory 34 is configured with one or more memory devices, and includes a non-volatile region 34a and a volatile region 34b. Information in the non-volatile region 34a is not erased even when the printer 10 is turned off. Information in the volatile region 34b is erased when the printer 10 is turned off. Information in the non-volatile region 34a is stored in advance, that is, before the printer 10 is shipped from the factory. Information in the volatile region 34b is stored in the course of processing executed by the CPU 32.

The non-volatile region 34a stores the programs 36, first and second output profiles OP1 and OP2, and a prescribed table PT. The programs 36 include programs for performing a print processing to be described later with reference to FIGS. 3 and 4. The first and second output profiles OP1 and OP2 are used for executing color conversion. The first and second output profiles OP1 and OP2 are output-side International Color Consortium (ICC) profiles that are used together with input profiles IP1, IP2, . . . , that are input-side ICC profiles and are included in the PDF file 100 (to be described later). The prescribed table PT is a table also used for executing color conversion. It is noted, however, that the prescribed table PT is not used together with the input profiles IP1, IP2, . . . .

The first output profile OP1 includes data for converting coordinate values defined in a device-independent color space into coordinate values defined in a standard color space. The device-independent color space is independent from the characteristics of devices. The device-independent color space is the L*a*b* color space in the present embodiment. In a variation, however, the device-independent color space may be, for example, the XYZ color space. Hereinafter, L*a*b* will be referred to simply as "Lab". The standard color space is a standard color space determined in advance. The standard color space is the RGB color space in the present embodiment. In a variation, however, the standard color space may be another color space.

The first output profile OP1 may be a grid-type profile, in which a plurality of coordinate values (for example, $17^3$ grids) defined in the Lab color space are associated with a plurality of coordinate values defined in the RGB color space. Alternatively, the first output profile OP1 may be a profile of a function type that indicates a function for converting a coordinate value in Lab color space to a coordinate value in RGB color space. Each of the output profile OP2 and the input profiles IP1, IP2, . . . may also be a profile of a grid type or a function type.

The second output profile OP2 includes data for converting the coordinate values that are obtained through conversion using the first output profile OP1, that is, the coordinate values defined in the standard color space (that is, RGB color space), into coordinate values defined in a device-dependent color space that is dependent on the characteristics of the device (printer 10). The device-dependent color space for the printer 10 is the CMYK color space in the present embodiment. In a variation, however, the device-dependent color space may be such a color space that has more colors than the four colors of CMYK. For example, the device-dependent color space may have six colors (that is, CMYK, orange, and green, for example), or eight colors.

The prescribed table PT is data for converting coordinate values defined in the standard color space (that is, RGB color space) to coordinate values defined in the device-dependent color space (that is, the CMYK color space) dependent on the characteristics of the printer 10. More specifically, the prescribed table PT is of a grid type, in which a plurality of coordinate values defined in the RGB color space (RGB coordinate values) and a plurality of coordinate values defined in the CMYK color space (CMYK coordinate values) are associated with each other. In a variation, however, data of a function type may be used in place of the prescribed table PT.

As described above, both of the second output profile OP2 and the prescribed table PT are profiles for converting coordinate values in the RGB color space into coordinate values in the CMYK color space. However, the second output profile OP2 and the prescribed table PT have different points described below. That is, in the output profile OP2, the C values do not depend on the G values or the B values, but depend only on the R values. Similarly, the M values and Y values depend only on G values and B values, respectively. Accordingly, in the second output profile OP2, the correspondence relationships between the RGB coordinate values and the CMYK coordinate values are defined so that each of C, M, and Y values depends only on the corresponding one of the R, G, and B values. In contrast, in the prescribed table PT, the correspondence relationships between the RGB coordinate values and the CMYK coordinate values are defined so that each of C, M, and Y values depends on two or more of the R, G, and B values. In a variation, the second output profile OP2 and the prescribed table PT may have the same data.

Configuration of PDF File 100

In the PDF file 100, each object is identified by a corresponding object identifier, such as "1obj", "2obj", or the like. The contents of each object are described at a position indicated by the corresponding object identifier. For example, the character string "/ICCBased 11obj" is described at a position indicated by the object identifier "10obj". This means the input profile IP1 is described at the position of the object identifier "11obj". At the position of the object identifier "12obj", the character string "ColorSpace 10obj" and object data OD1 are described. This means that color conversion needs to be executed on the object data OD1 by using an input profile defined at "10obj", that is, the input profile IP1 described at "11obj". In this way, according to the description contents at the object identifiers "10obj" to "12obj", the input profile IP1 and the object data OD1, on which color conversion using the input profile IP1 needs to be executed, are associated with each other.

Similarly, an input profile IP2 and object data OD2 are associated with each other according to the description contents at the object identifiers "20obj" to "22obj". It is noted that not only one set of object data (for example, OD1) is always associated with one input profile (for example, IP1). For example, two or more sets of object data, including the object data OD1, may be associated with the same input profile IP1. In addition, objet data is not always associated with an input profile. Object data may be associated with no input profile. As described above, the PDF file 100 includes a plurality of sets of object data and a plurality of input profiles. The plurality of sets of object data may include: those set of object data that is associated with some input profile; and those set of object data that is associated with no input profile.

Each of the input profiles IP1 and IP2 includes data for converting coordinate values defined in a device-dependent color space that depends on the characteristics of a device (for example, the terminal device 50) that has generated the PDF file 100, to coordinate values defined in the device-independent color space (that is, the Lab color space). The device-dependent color space for the device that has generated the PDF file 100 is the RGB color space in the present embodiment, but may be a color space other than the RGB color space in a variation.

Each of the object data OD1 and OD2 is such data, in which colors are represented by coordinate values defined in the device-dependent color space (that is, the RGB color space) for the device that has generated the PDF file 100. More specifically, each of the object data OD1 and OD2 is a set of bitmap data indicative of an image object, and is configured from a plurality of pixels, each pixel indicating a coordinate value defined in the RGB color space.

Figure 2:
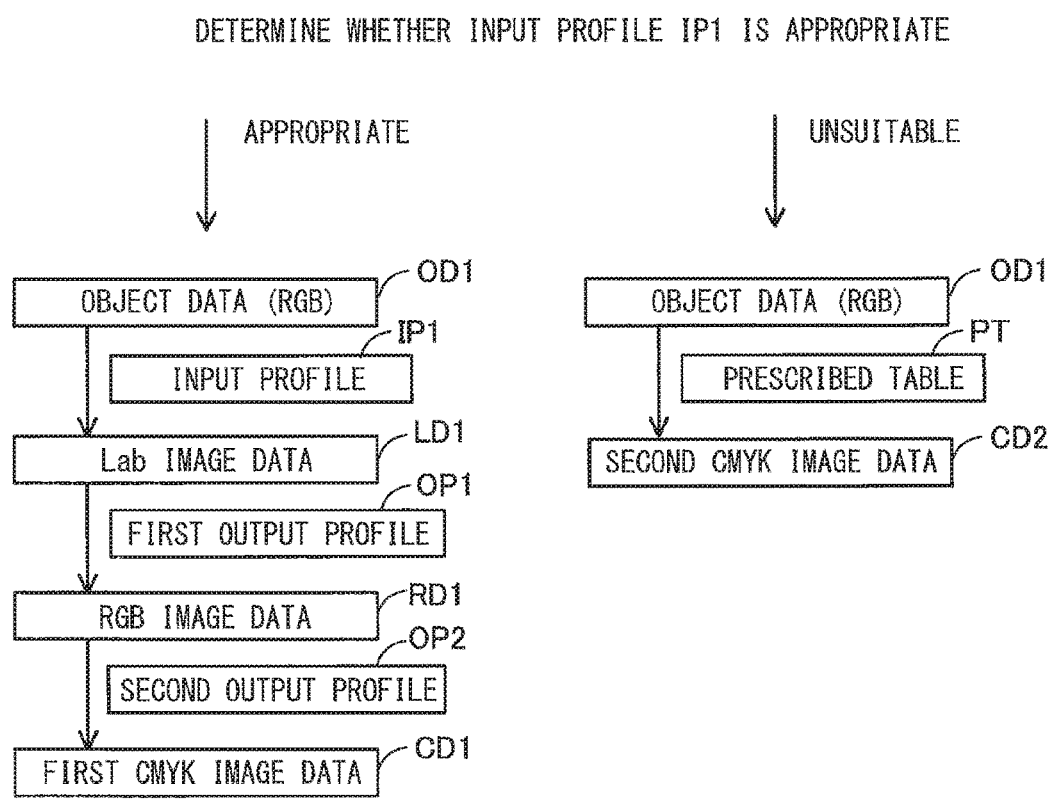
FIG. 2 illustrates the summary of a processing according to the first embodiment.

Summary of First Embodiment; FIG. 2

Next will be described with reference to FIG. 2 the manner how the printer 10 prints an image expressed by the PDF file 100. The printer 10 determines whether or not the input profile IP1 is appropriate for the object data OD1 on the basis of the input profile IP1.

More specifically, the printer 10 determines that the input profile IP1 is appropriate for the object data OD1 when it is highly likely that colors defined by the object data OD1 can be output correctly if color conversion is executed on the object data OD1 by using the input profile IP1. In such a case, the printer 10 uses first CMYK image data CD1, which is obtained by executing the ICC color conversion on the object data OD1, in order to print an image of the object data OD1. The ICC color conversion is a color conversion that uses the input profile IP1 and the output profiles OP1 and OP2. More specifically, in the ICC color conversion, the object data OD1 is first converted into Lab image data LD1 by the input profile IP1. The Lab image data LD1 is then converted into RGB image data RD1 by the first output profile OP1. The RGB image data RD1 is then converted into the first CMYK image data CD1 by the second output profile OP2.

On the other hand, the printer 10 determines that the input profile IP1 is unsuitable for the object data OD1 when it is highly likely that colors defined by the object data OD1 cannot be output correctly if color conversion is executed on the object data OD1 by using the input profile IP1. In such a case, the printer 10 uses second CMYK image data CD2, which is obtained by executing table color conversion on the object data OD1, in order to print an image of the object data OD1. The table color conversion is a color conversion that does not use the input profile IP1 or the output profiles OP1 and OP2, but uses the prescribed table PT. In the table color conversion, the object data OD1 is converted directly to the second CMYK image data CD2. No conversion through the Lab color space or the RGB color space is executed.

As to each of the other object data such as the object data OD2 in the PDF file 100, the printer 10 similarly determines whether the corresponding input profile such as the input profile IP2 is appropriate, and uses CMYK image data that is obtained through either the ICC color conversion or the table color conversion dependently on the determination results.

The CMYK image data thus obtained through the ICC color conversion or the table color conversion is multi-tone (for example, 256-tone) image data. Accordingly, after having generated a plurality of sets of CMYK image data from a plurality of sets of object data OD1, OD2, . . . , the printer 10 executes half-tone processing on the multi-tone CMYK image data, to thereby generate CMYK image data having fewer tones (for example, two or three tones), which will hereinafter be referred to as "print data". The printer 10 then supplies the print data to the print engine 18, whereupon the print engine 18 prints an image defined by the PDF file 100 based on the print data.

As described above, the printer 10 determines whether or not the input profile IP1 is appropriate for the object data OD1, and uses CMYK image data corresponding to a result of the determination to execute printing of an image. For this reason, the printer 10 can execute printing of a high-quality image, in which colors defined by the object data OD1 are correctly expressed.

Figure 3:
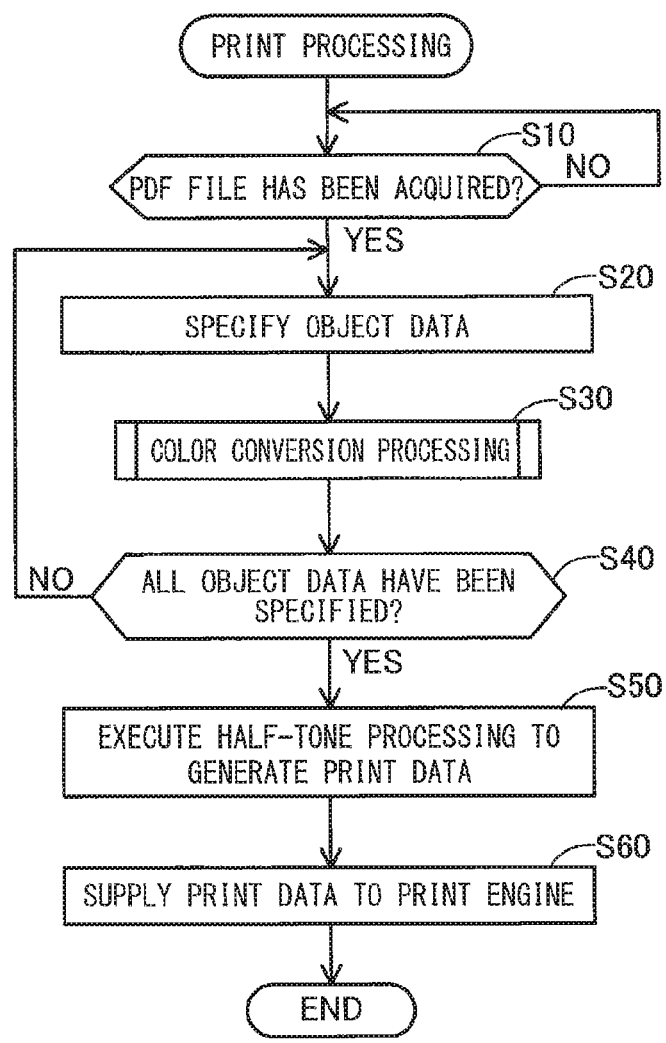
FIG. 3 is a flowchart of a print processing according to the first embodiment.

Print Processing; FIG. 3

Next will be descried, with reference to FIG. 3, the print processing executed by the CPU 32 of the printer 10.

While the printer 10 is ON, the CPU 32 repeatedly executes the print processing of FIG. 3.

In the print processing, first in S10, the CPU 32 monitors whether the CPU 32 has acquired the PDF file 100 from the terminal device 50 through the network interface 16. The process proceeds to S20 when the CPU 32 has acquired the PDF file 100 (YES in S10).

In S20, the CPU 32 detects the object identifiers in the PDF file 100 in an ascending order, and specifies one set of object data (for example, OD1 in FIG. 1). More specifically, the CPU 32 specifies one object identifier (for example, "12obj" in FIG. 1), at which one set of object data OD1 is described. Hereinafter, the specified object data (OD1 in this example) and the specified object identifier ("12obj" in this example) will be referred to as "target object data" and "target object identifier", respectively.

In S30, the CPU 32 executes color conversion processing on the target object data (see FIG. 4) to generate CMYK image data. Next, in S40, the CPU 32 determines whether or not all object data in the PDF file 100 have already been specified in S20. More specifically, when it is confirmed that no other object data are described in the portion of the PDF file following the target object identifier that has been specified at the latest in S20, the judgment in S40 becomes positive, and the process proceeds to S50. On the other hand, when it is confirmed that some object data are described in the portion of the PDF file following the latest-specified target object identifier, the judgment in S40 becomes negative, and the process returns to S20.

The process of S50 starts being executed when multi-tone (for example, 256-tone) CMYK image data has been generated from all the object data contained in the PDF file 100. Therefore, in S50, the CPU 32 executes half-tone processing on the multi-tone CMYK image data to generate print data. Next, in S60, the CPU 32 supplies the print data generated in S50 to the print engine 18, thereby controlling the print engine 18 to execute printing of an image expressed by the print data. When the process of S60 is completed, the processing of FIG. 3 is ended.

Color Conversion Processing; FIG. 4

Next will be described, with reference to FIG. 4, the contents of the color conversion processing executed in S30 (FIG. 3).

In the color conversion processing of S30, first, in S100, the CPU 32 determines whether or not the target object data is associated with an input profile. More specifically, when the description contents of the target object identifier include a character string defining an input profile, such as "Color-Space 10obj" (FIG. 1), the judgment in S100 becomes positive, and the process proceeds to S110. Hereinafter, an input profile associated with the target object data will be referred to as "target input profile". On the other hand, when the description contents of the target object identifier include no such input-profile-defining character string, the judgment in S100 becomes negative, and proceeds to S140.

In S110, the CPU 32 executes color conversion on the target object data by using the target input profile to generate Lab image data. More specifically, the CPU 32 executes color conversion on a plurality of pixels in the target object data (that is, coordinate values in the RGB color space (hereinafter referred to as "RGB coordinate values")) by using the target input profile, to thereby generate Lab image data including a plurality of pixels indicating coordinate values in the Lab color space (hereinafter referred to as "Lab coordinate values").

For example, assume that the target input profile is of a function type. In this case, the CPU 32 substitutes, into a function of the target input profile, the RGB coordinate value of a pixel to be converted, thereby calculating an Lab coordinate value for the pixel.

For another example, assume that the target input profile is of a grid type. If the target input profile includes an RGB coordinate value that is equal to the RGB coordinate value of the pixel to be converted, the CPU 32 specifies an Lab coordinate value that is associated with the RGB coordinate value in the target input profile. On the other hand, if the target input profile includes no RGB coordinate value that is equal to the RGB coordinate value of the pixel to be converted, the CPU 32 executes interpolation processing using one or more RGB coordinate values in the target input profile that exist in the vicinity of the RGB coordinate value of the pixel to be converted, thereby calculating an Lab coordinate value for the pixel.

It is noted that the color conversion that uses each of the output profile OP1, output profile OP2, and prescribed table PT (to be described later with reference to S130 and S140) is executed in a similar manner as described above.

Next, in S112, the CPU 32 calculates the number of non-reproducible pixels among the plurality of pixels in the Lab image data generated in S110. The non-reproducible pixels are those pixels whose Lab coordinate values fail to be within a color range of the Lab color space that can be expressed by the printer 10. The color range that can be expressed by the printer 10 is defined in the first output profile OP1. Accordingly, in S112, the CPU 32 first refers to the first output profile OP1 to specify the color range of the Lab color space that can be expressed by the printer 10. The CPU 32 then determines whether or not an Lab coordinate value indicated by each of the plurality of pixels in the Lab image data is included in the specified color range. The CPU 32 calculates the number of those pixels whose Lab coordinate values are not included in the specified color range, to thereby determine the number of the non-reproducible pixels.

Next, in S120, the CPU 32 determines whether or not the number of the non-reproducible pixels calculated in S112 is smaller than a threshold value. In the present embodiment, the threshold value is obtained by multiplying the number of pixels in the Lab image data by a predetermined percentage (for example, 5 percent). In a variation, however, the threshold value may be a predetermined fixed value that is not dependent on the number of pixels in the Lab image data. When it is determined that the proportion of the non-reproducible pixels is less than the threshold value (YES in S120), the CPU 32 proceeds to S130. When it is determined that the proportion of the non-reproducible pixels is larger than or equal to the threshold value (NO in S120), the CPU 32 proceeds to S140.

In a variation, in S112 and S120, the CPU 32 may specify reproducible pixels, whose Lab coordinate values fall within the color range that can be expressed by the printer 10, from among the plurality of pixels in the Lab image data, and calculate the number of the reproducible pixels. When the number of the reproducible pixels is larger than or equal to the threshold value, the judgment in S120 becomes positive. When the number of the reproducible pixels is smaller than the threshold value, the judgment in S120 becomes negative. This variation is equivalent to the configuration of determining whether or not the number of the non-reproducible pixels is smaller than the threshold value.

Next, in S130, the CPU 32 executes color conversion on the Lab image data generated in S110, by using the output profiles OP1 and OP2 in succession, to thereby generate the first CMYK image data.

More specifically, the CPU 32 first executes color conversion on each of the plurality of pixels (that is, Lab coordinate values) in the Lab image data by using the output profile OP1, to thereby generate RGB image data including a plurality of pixels indicating RGB coordinate values. It is noted that when color conversion needs to be executed on the non-reproducible pixels, the CPU 32 executes color conversion employing gamut mapping. Gamut mapping is a technique of color conversion to replace a color of a non-reproducible pixel with such a color that is close to the non-reproducible color but is within the color range that can be expressed by the printer 10.

Next, the CPU 32 executes color conversion on each of the plurality of pixels (that is, RGB coordinate values) in the RGB image data by using the output profile OP2, to thereby generate the first CMYK image data including a plurality of pixels indicating coordinate values defined in the CMYK color space (hereinafter referred to as "CMYK coordinate values"). When the process of S130 is completed, the processing of FIG. 4 is ended.

In S140, the CPU 32 executes color conversion on the target object data by using the prescribed table PT to generate the second CMYK image data. Thus, the CPU 32 converts the target object data directly into the second CMYK image data, but not through the Lab color space or the RGB color space. More specifically, the CPU 32 executes the color conversion on each of the plurality of pixels (that is, RGB coordinate values) in the target object data by using the prescribed table PT, to thereby generate the second CMYK image data including a plurality of pixels indicative of CMYK coordinate values. When the process of S140 is completed, the processing of FIG. 4 is ended.

Example of Processing Flow

Next will be described a specific example of the processing in FIGS. 3 and 4.

First, the printer 10 executes ICC color conversion on the object data OD1 by using the input profile IP1, to thereby generate the Lab image data LD1 (S110).

That the number of the non-reproducible pixels in the Lab image data LD1 is smaller than the threshold value means that there is high possibility that the ICC color conversion can be executed appropriately on the object data OD1, that is, there is high possibility that colors defined by the object data OD1 can be output correctly through the ICC color conversion. Accordingly, when it is determined that the number of the non-reproducible pixels is smaller than the threshold value (YES in S120), that is, the input profile IP1 is appropriate, the printer 10 executes color conversion on the Lab image data LD1 by using the output profiles OP1 and OP2 in succession, to thereby generate the RGB image data RD1 and then generate the first CMYK image data CD1 (S130). In this manner, the printer 10 can print a high-quality image in which colors defined by the object data OD1 are expressed relatively correctly.

On the other hand, that the number of the non-reproducible pixels is larger than or equal to the threshold value means that there is high possibility that colors defined by the object data OD1 (hereinafter may be referred to as "original colors") cannot be output correctly through the ICC color conversion. This is because, when the number of non-reproducible pixels is relatively large, there is high possibility that such pixels, whose colors are significantly different from the original colors, will be generated through the gamut mapping operation that is executed on the non-reproducible pixels. Accordingly, when it is determined that the number of the non-reproducible pixels is larger than or equal to the threshold value (NO in S120), that is, it is determined that the input profile IP1 is unsuitable, the printer 10 executes table color conversion on the object data OD1 by using the prescribed table PT, to thereby generate the second CMYK image data CD2 (S140). In this manner, the printer 10 can print a high-quality image in which the original colors are expressed relatively correctly.

Now assume a configuration of a comparative example, in which the determination of S120 is not executed, and the table color conversion is executed on all object data in the PDF file 100. According to the configuration of the comparative example, the ICC color conversion is not executed on non-reproducible pixels, and therefore it seems that a high-quality image can be printed. It is noted, however, that as to those colors that fall within the color range that can be expressed by the printer 10, the original colors can be output correctly when the ICC color conversion is executed appropriately, in comparison with the case where the table color conversion is executed. In the present embodiment, the printer 10 switches between the ICC color conversion and the table color conversion in accordance with whether or not the input profile is appropriate. In this manner, the printer 10 of the present embodiment can print an image in which the original colors are expressed correctly in comparison with the configuration of the comparative example.

The printer 10 determines, based on both of the input profile IP1 and the object data OD1, whether or not the input profile IP1 is appropriate (S110 to S120). In particular, the printer 10 determines whether or not the input profile IP1 is appropriate based on the results of the color conversion processing using the input profile IP1 (that is, the Lab image data LD1). For this reason, the printer 10 can appropriately determine whether or not the input profile IP1 is appropriate.

Correspondence Relationships

The printer 10 and the print engine 18 are examples of "image processing apparatus" and "output device", respectively. The RGB color space that depends on the characteristics of the device that has generated the PDF file 100, the Lab color space, and the CMYK color space are examples of "first color space", "specific color space", and "second color space", respectively. The ICC color conversion and the table color conversion are examples of "first type color conversion" and "second type color conversion", respectively. The processing of S110 is an example of "input-side color conversion processing" and "target color conversion processing". The processing of S130 is an example of "output-side color conversion processing". The object data OD1, the Lab image data LD1, the first CMYK image data CD1, and the second CMYK image data CD2 are examples of "target data", "intermediate data", "first type post-conversion data", and "second type post-conversion data", respectively.

Variation of First Embodiment

Instead of executing the process of S130 (FIG. 4), the CPU 32 may execute a processing described below.

That is, the CPU 32 executes color conversion on each of a plurality of (for example, $17^3$) RGB coordinate values, which are determined in advance, by using the target input profile and the output profiles OP1 and OP2 in succession, to thereby calculate a plurality of CMYK coordinate values. Next, the CPU 32 generates a conversion table, in which the plurality of RGB coordinate values and the plurality of CMYK coordinate values are associated with each other. Then, the CPU 32 executes ICC color conversion on the object data OD1 by using the conversion table, to generate the first CMYK image data. In the present variation, the ICC color conversion using the conversion table is an example of "first type color conversion".

Figure 5:
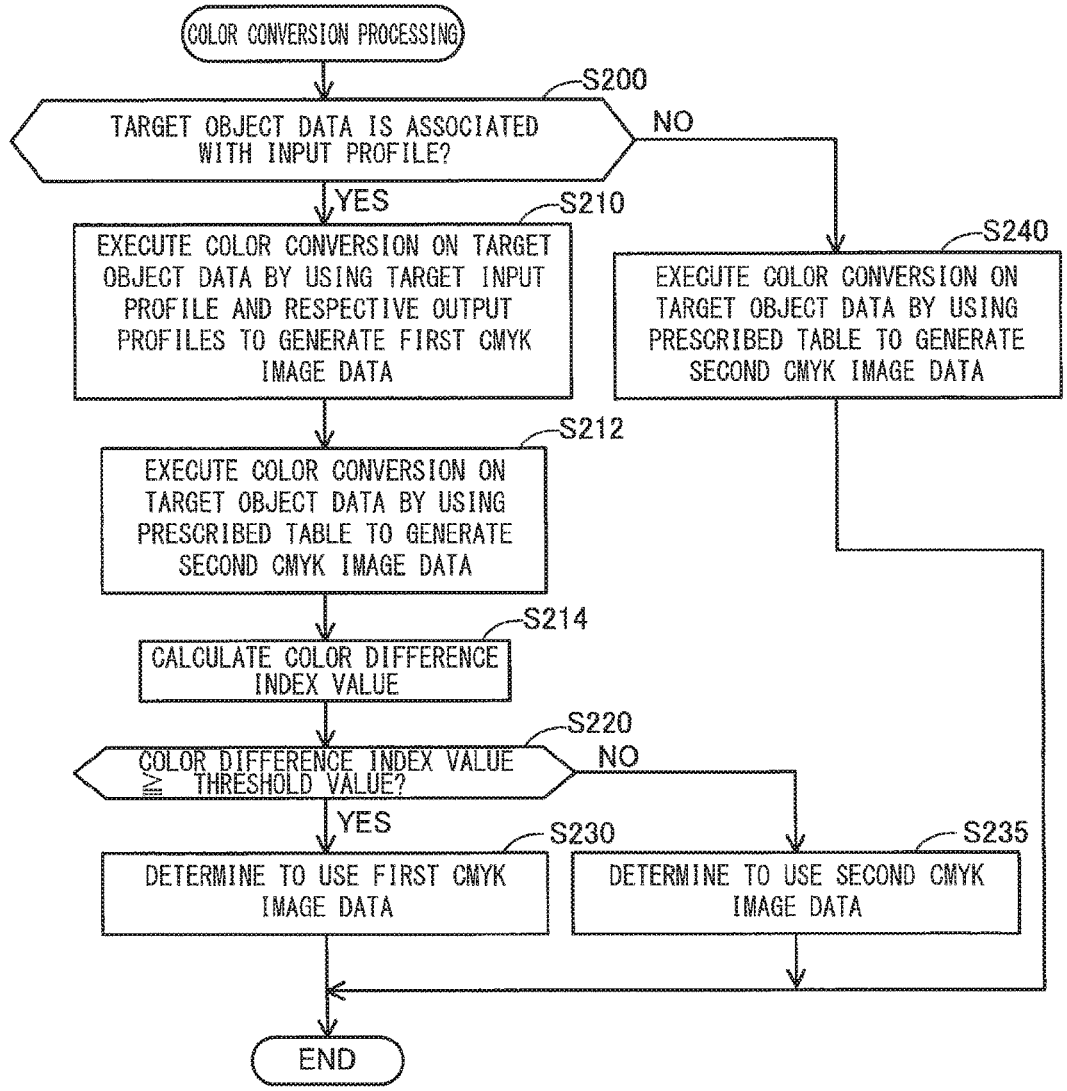
FIG. 5 illustrates a flowchart of the color conversion processing according to a second embodiment.

Second Embodiment: FIG. 5

In a second embodiment, the CPU 32 executes a processing shown in FIG. 5 in the color conversion processing of S30 (FIG. 3). In the processing of FIG. 5, the process of S200 is the same as the process of S100 in FIG. 4. The process of S240, which is executed when the judgement in S200 is negative, is the same as the process of S140 in FIG. 4. When the process of S240 is completed, the processing of FIG. 5 is completed. The process of S210, which is executed when the judgment in S200 is positive, is the same as the combination of the processes of S110 and S130 in FIG. 4. The process of S212 is the same as the process of S140 in FIG. 4. When the process of S212 is completed, the processing proceeds to S214.

In S214, the CPU 32 calculates a color difference index value indicative of a color difference between the plurality of pixels in the first CMYK image data generated in S210 (that is, CMYK coordinate values) and the plurality of pixels in the second CMYK image data generated in S212 (that is, CMYK coordinate values). More specifically, the CPU 32 first calculates a distance (that is, Euclidean distance) between a CMYK coordinate value of a first pixel in the first CMYK image data and a CMYK coordinate value of a second pixel in the second CMYK image data. The first and second pixels are those pixels that are obtained by executing the corresponding color conversions on the same pixel in the target object data. The CPU 32 calculates distances for other pixels in the first and second CMYK image data in the same manner as for the first pixel in the first CMYK image data and the second pixel in the second CMYK image data. As a result, the CPU 32 calculates a plurality of distances which are as many as the number of pixels in the target object data (that is, the number of pixels in each of the first or second CMYK image data). Next, the CPU 32 calculates a color difference index value by dividing the sum of the plurality of distances by the number of pixels in the target object data. Accordingly, the larger the color difference index value is, the larger a color difference between the first and second CMYK image data is.

In S220, the CPU 32 determines whether or not the color difference index value calculated in S214 is larger than or equal to a threshold value. The threshold value in the present embodiment is a fixed value (for example, 5) that is determined in advance. In a variation, however, the threshold value may be a variable value that changes in accordance with the number of pixels in the target object data. When it is determined that the color difference index value is larger than or equal to the threshold value (YES in S220), in S230 the CPU 32 determines to use the first CMYK image data generated in S210. On the other hand, when it is determined that the color difference index value is smaller than the threshold value (NO in S220), in S235 the CPU 32 determines to use the second CMYK image data generated in S212. In this manner, in S50 in FIG. 3, the CPU 32 uses the CMYK image data that is determined in S230 or S235 to generate the print data.

Figure 6:
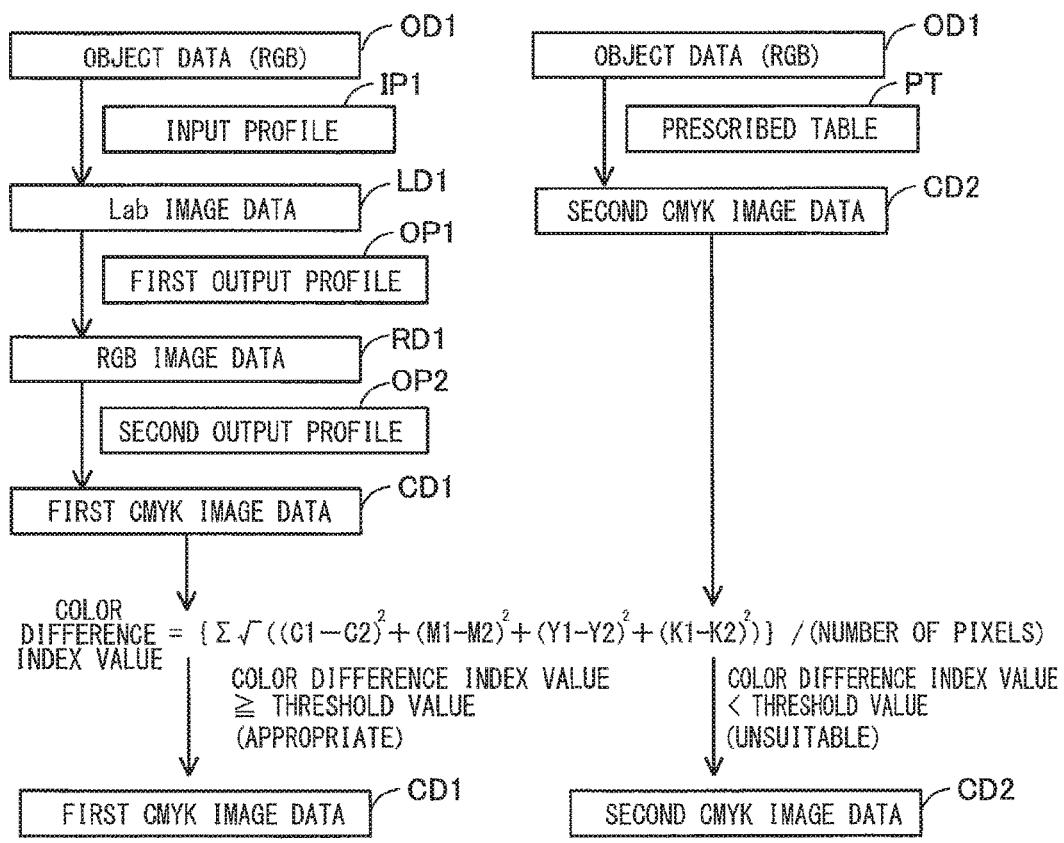
FIG. 6 illustrates an example of a flow of the color conversion processing according to the second embodiment.

Example of Processing Flow; FIG. 6

Next will be described a specific example of the processing in FIG. 5 with reference to FIG. 6.

The printer 10 executes the ICC color conversion on the object data OD1 to generate the first CMYK image data CD1 (S210). The printer 10 then executes the table color conversion on the object data OD1 to generate the second CMYK image data CD2 (S212). The printer 10 calculates a color difference index value indicating a color difference between the first and second CMYK image data CD1 and CD2 (S214).

That the color difference index value is larger than or equal to the threshold value means that influence of the ICC color conversion using the input profile IP1 is large and hence there is high possibility that the original colors cannot be output correctly unless the ICC color conversion is executed. That is, there is high possibility that the original colors can be output correctly if the ICC color conversion is executed. Accordingly, when it is determined that the color difference index value is larger than or equal to the threshold value (YES in S220), that is, it is determined that the input profile IP1 is appropriate, the printer 10 determines to use the first CMYK image data CD1 obtained by the ICC color conversion (S230). In this manner, the printer 10 can print a high-quality image.

That the color difference index value is smaller than the threshold value means that influence of the ICC color conversion using the input profile IP1 is small, and there is high possibility that the original colors can be output correctly even though the ICC color conversion is not executed. In particular, if the ICC color conversion is executed, gamut mapping will be executed on non-reproducible pixels, and therefore there is high possibility that pixels whose colors are significantly different from their original colors will be generated. Accordingly, when it is determined that the color difference index value is smaller than the threshold value (NO in S220), that is, the input profile IP1 is unsuitable, the printer 10 determines to use the second CMYK image data CD2 obtained through the table color conversion (S230). In this manner, the printer 10 can print a high-quality image.

The printer 10 determines whether or not the input profile IP1 is appropriate on the basis of both the input profile IP1 and the object data OD1 (S220). In particular, the printer 10 determines whether or not the input profile IP1 is appropriate on the basis of a result of the color conversion processing using the input profile IP1, that is, the first CMYK image data CD1 (S220). For this reason, the printer 10 can appropriately determine whether or not the input profile IP1 is suitable.

Correspondence Relationships

The processing of S210 is an example of "target color conversion processing". All pixels in the object data OD1 are examples of "N1 number of pixels" and "target data". The first CMYK image data CD1 is an example of "first determination data" and "first type post-conversion data". The second CMYK image data CD2 is an example of "second determination data" and "second type post-conversion data".

Variations of Second Embodiment

In S214, the CPU 32 may calculate the color difference index value in a manner described below.

That is, as in the second embodiment, the CPU 32 first calculates a distance between a CMYK coordinate value of each pixel in the first CMYK image data and a CMYK coordinate value of each pixel in the second CMYK image data. Next, the CPU 32 counts or calculates the number of those pixels, for which the calculated distances are larger than or equal to a predetermined value, and sets the counted number as a color difference index value. In this case, the larger the color difference index value is, the larger the color difference is. The CPU 32 uses, as the threshold value, a value that is obtained by multiplying the number of pixels in the first CMYK image data by a predetermined percentage (for example, 5 percent) in S220.

In another variation, the CPU 32 counts or calculates the number of those pixels, for which the calculated distances are smaller than the predetermined value, and sets the counted number as a color difference index value. In this case, the larger the color difference index value is, the smaller the color difference is. The CPU 32 executes the process of S230 when the color difference index value is smaller than the threshold value, that is, when the color difference is larger than or equal to the threshold value. The CPU 32 executes the process of S235 when the color difference index value is larger than or equal to the threshold value, that is, when the color difference is smaller than the threshold value. In each of third to fifth embodiments to be described later, the color difference index value may be modified similarly as in the present variation.

Third Embodiment; FIG. 7

In a third embodiment, the CPU 32 executes a processing shown in FIG. 7 in the color conversion processing of S30 (FIG. 3). In the process of FIG. 7, the process of S300 is the same as the process in S100 in FIG. 4. The process of S340 that is executed in response to the negative judgment in S300 is the same as the process of S140 in FIG. 4. When the process of S340 is completed, the processing of FIG. 7 is ended. When the judgment in S300 becomes positive, the processing proceeds to S310.

In S310, the CPU 32 uses the target object data to calculate the number of group pixels belonging to each of a plurality of coordinate value groups. As shown in FIG. 8, a plurality of coordinate value groups are determined in advance in the RGB color space. More specifically, the entire range of R values (0 to 255) is divided into four sub-ranges (that is, 0 to 63, 64 to 127, 128 to 191, and 192 to 255). Similarly, the entire ranges of G values and B values are also divided into four sub-ranges. A combination of sub-ranges, one from each of R value, G value, and B value, constitutes one coordinate value group. For example, a combination of a sub-range indicating R values (0 to 63), a sub-range indicating G values (0 to 63), and a sub-range indicating B values (0 to 63) constitutes a first group. As a result, total of 64 (=4×4×4) coordinate value groups exist. In a variation, the number of coordinate value groups may be smaller than or larger than 64. In S310 in FIG. 7, the CPU 32 first specifies those pixels, whose RGB coordinate values are in the first group, from among the plurality of pixels in the target object data. The CPU 32 then calculates the number of the specified pixels, to thereby calculate the number of group pixels belonging to the first group. The CPU 32 similarly calculates the number of group pixels for each of the other 63 coordinate value groups.

In S312, the CPU 32 compares the numbers of group pixels calculated in S310, and selects a largest coordinate value group that has the largest number of group pixels from among the 64 coordinate value groups. The largest coordinate value group can be considered as indicative of a color range that appears most frequently in the target object data.

In S314, the CPU 32 first specifies, among the plurality of pixels in the target object data, those pixels whose RGB coordinate values fall in the largest coordinate value group selected in S312 (hereinafter referred to "target pixels"). The CPU 32 executes the ICC color conversion on the target pixels, which are part of the plurality of pixels in the target object data, to thereby generate first determination data including pixels indicating CMYK coordinate values. The CPU 32 stores, in the memory 34, positional data indicating positions of pixels in the target object data from which the pixels in the first determination data are obtained.

In S316, the CPU 32 executes the table color conversion on the target pixels specified in S314, to thereby generate second determination data including pixels indicating CMYK coordinate values. The CPU 32 stores positional data in the memory 34 in a similar manner as S314.

In S318, the CPU 32 calculates a color difference index value indicating a color difference between the pixels in the first determination data generated in S314 (that is, CMYK coordinate values) and the pixels in the second determination data generated in S316 (that is, CMYK coordinate values). More specifically, the CPU 32 calculates the sum of the distances between the pixels in the first determination data and the pixels in the second determination data in the same manner as in the process of S214 in FIG. 5, and divides the sum of the distances by the number of the target pixels (that is, the number of the pixels in each of the first and second determination data) to calculate a color difference index value.

In S320, the CPU 32 determines whether or not the color difference index value calculated in S318 is larger than or equal to a threshold value. When it is determined that the color difference index value is larger than or equal to the threshold value (YES in S320), the CPU 32 proceeds to S330. When it is determined that the color difference index value is smaller than the threshold value (NO in S320), the CPU 32 proceeds to S335.

In S330, the CPU 32 first specifies pixels other than the target pixels specified in S314 (hereinafter referred to as "other pixels") among the plurality of pixels in the target object data. That is, the other pixels are those pixels that are from among the plurality of pixels in the target object data and indicate coordinate values belonging to coordinate value groups other than the largest coordinate value group. The CPU 32 executes the ICC color conversion on the other pixels to generate first partial data including pixels indicating CMYK coordinate values. The CPU 32 stores, in the memory 34, positional data indicating positions of the pixels in the target object data from which the pixels in the first partial data are obtained.

In S332, the CPU 32 uses the first determination data generated in S314 and the first partial data generated in S330 to generate the first CMYK image data. More specifically, the CPU 32 generates the first CMYK image data by arranging the pixels in the first determination data in accordance with the positional data stored in S314 and arranging the pixels in the first partial data in accordance with the positional data stored in S330. When the process of S332 is completed, the processing of FIG. 7 is ended.

In S335, the CPU 32 specifies the other pixels in a similar manner as in S330, and executes the table color conversion on the other pixels to generate second partial data including pixels indicating CMYK coordinate values. The CPU 32 stores positional data in the memory 34 in a similar manner as in S330.

In S337, the CPU 32 uses the second determination data generated in S316 and the second partial data generated in S335 to generate the second CMYK image data in a similar manner as in S332. When the process of S337 is completed, the processing of FIG. 7 is ended.

Example of Processing Flow; FIG. 8

Next will be described a specific example of the processing in FIG. 7 with reference to FIG. 8.

The printer 10 calculates, based on the object data OD1, the number of group pixels belonging to each coordinate value group (S310), and selects the first group as a largest coordinate value group (S312). Next, the printer 10 executes the ICC color conversion on the target pixels, which are among the plurality of pixels in the object data OD1 and whose RGB coordinate values fall in the first group, to thereby generate first determination data DD1 (S314). The printer 10 also executes the table color conversion on the target pixels to generate second determination data DD2 (S316). The printer 10 calculates a color difference index value indicating a color difference between the first and second determination data DD1 and DD2 (S318), and compares the color difference index value with the threshold value (S320).

As described above, in the present embodiment, the printer 10 calculates the color difference index value by executing the ICC color conversion and the table color conversion only on the target pixels that are part of the object data OD1. For this reason, the printer 10 can promptly determine whether the input profile IP1 is appropriate, in comparison to a comparative configuration, in which the ICC color conversion and the table color conversion are executed on all pixels in the object data OD1 to calculate the color difference index value. In particular, the target pixels are those pixels that are included in the color range that appears most frequently in the target object data. Accordingly, the printer 10 can execute appropriate determination in order to correctly output colors in the most-frequently-appearing color range.

When it is determined that the color difference index value is larger than or equal to the threshold value (YES in S320), that is, when it is determined that the input profile IP1 is appropriate, the printer 10 executes the ICC color conversion on those pixels that are among the plurality of pixels in the object data OD1 and that indicate RGB coordinate values falling in groups other than the first group (that is, the "other pixels"), to thereby generate first partial data PD1 (S330). The printer 10 can execute the processing of S330 promptly because the printer 10 does not execute the ICC color conversion on the target pixels in this step. The printer 10 uses the first determination data DD1 and the first partial data PD1 to generate the first CMYK image data CD1 (S332). In this manner, the printer 10 can print a high-quality image.

On the other hand, when it is determined that the color difference index value is smaller than the threshold value (NO in S320), that is, when it is determined that the input profile IP1 is unsuitable, the printer 10 executes the table color conversion on the other pixels among the plurality of pixels in the object data OD1, to thereby generate the second partial data PD2 (S335). Since the printer 10 does not execute the table color conversion on the target pixels in S335, the printer 10 can execute the processing of S335 promptly. The printer 10 uses the second determination data DD2 and the second partial data PD2 to generate the second CMYK image data CD2 (S337). In this manner, the printer 10 can print a high-quality image.

The printer 10 determines whether or not the input profile IP1 is appropriate on the basis of both the input profile IP1 and the object data OD1 (S320). In particular, the printer 10 determines whether or not the input profile IP1 is appropriate on the basis of a result of the color conversion processing using the input profile IP1 (that is, the first determination data DD1) (S320). For this reason, the printer 10 can properly determine whether or not the input profile IP1 is appropriate.

Correspondence Relationships

The processing of S314 is an example of "target color conversion processing". The target pixels in the object data OD1 are an example of "N1 number of pixels" and "target data". The other pixels in the object data OD1 are an example of "N2 number of pixels".

Variation of Third Embodiment

In order to generate the first CMYK image data, the CPU 32 may execute the ICC color conversion on all the pixels in the target object data, instead of executing the processes of S330 and S332 in FIG. 7. Similarly, in order to generate the second CMYK image data, the CPU 32 may execute the table color conversion on all pixels in the target object data, instead of executing the processes of S335 and S337. In the present variation, the CPU 32 does not need to store positional data in the memory 34 in S314 and S316.

Figure 9:
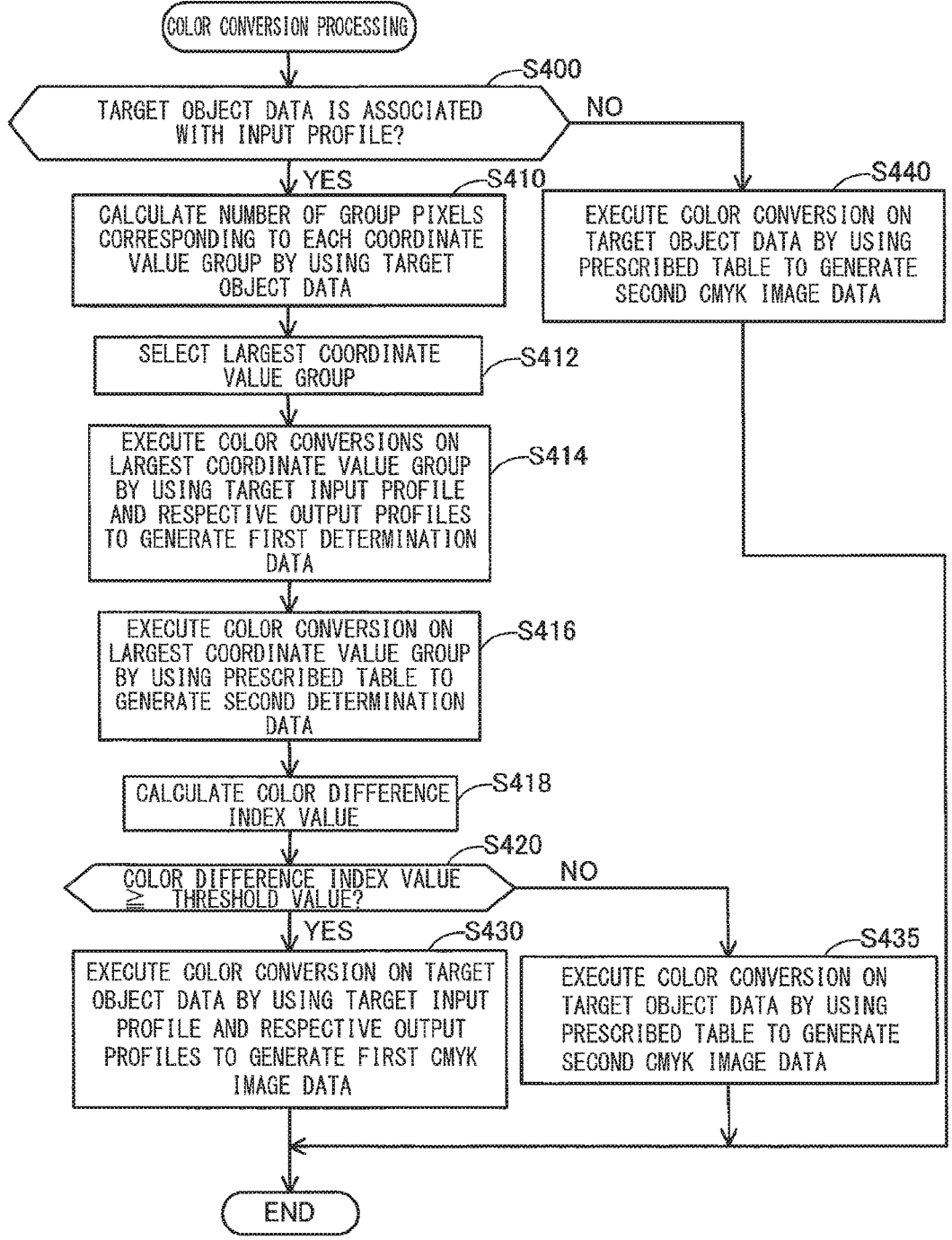
FIG. 9 illustrates a flowchart of the color conversion processing according to a fourth embodiment.

Fourth Embodiment; FIG. 9

In a fourth embodiment, the CPU 32 executes a processing shown in FIG. 9 in the color conversion processing of S30 (FIG. 3).

In the processing of FIG. 9, the process of S400 is the same as the process of S100 in FIG. 4. The process of S440 which is executed in response to the negative determination in S400 is the same as the process of S140 in FIG. 4. When the process of S440 is completed, the processing of FIG. 9 is ended. The processes of S410 and S412 that are executed in response to the positive determination in S400 are the same as the processes of S310 and S312 in FIG. 7.

In S414, the CPU 32 executes the ICC color conversion on all of the plurality of RGB coordinate values that constitute the largest coordinate value group, to thereby generate first determination data including a plurality of CMYK coordinate values. In S416, the CPU 32 executes the table color conversion on all the RGB coordinate values constituting the largest coordinate value group, to thereby generate second determination data including a plurality of CMYK coordinate values. In S418, the CPU 32 calculates a color difference index value indicating a color difference between the plurality of CMYK coordinate values in the first determination data generated in S414 and the plurality of CMYK coordinate values in the second determination data generated in S416. More specifically, in a similar manner as in the process of S214 in FIG. 5, the CPU 32 calculates a color difference index value by calculating the sum of a plurality of distances between the plurality of CMYK coordinate values in the first determination data and the plurality of CMYK coordinate values in the second determination data, and dividing the sum of the plurality of distances by the number of the RGB coordinate values included in the largest coordinate value group (that is, the number of the CMYK coordinate values in each of the first determination data and the second determination data.

In S420, the CPU 32 determines whether or not the color difference index value calculated in S418 is larger than or equal to a threshold value. When it is determined that the color difference index value is larger than or equal to the threshold value (YES in S420), the CPU 32 executes processing the same as that in S210 in FIG. 5 to generate the first CMYK image data in S430. When it is determined that the color difference index value is smaller than the threshold value (NO in S420), the CPU 32 executes processing the same as that in S440 in FIG. 9 to generate the second CMYK image data in S435. When the process of S430 or S435 is completed, the processing of FIG. 9 is ended.

Figure 10:
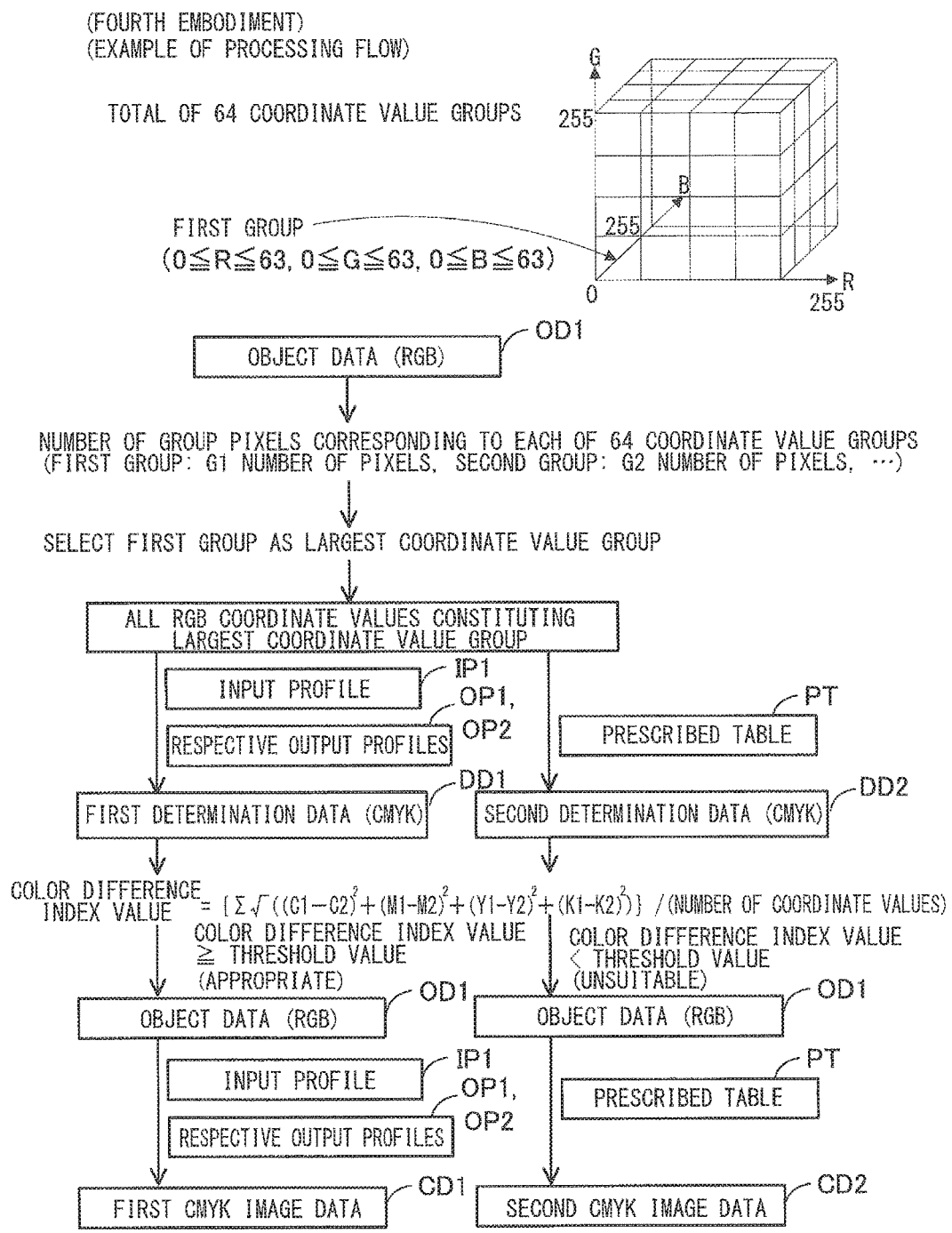
FIG. 10 illustrates an example of a flow of the color conversion processing according to the fourth embodiment.

Example of Processing Flow; FIG. 10

Next will be described a specific example of the processing in FIG. 9 with reference to FIG. 10.

When the first group is selected as the largest coordinate value group (S412), the printer 10 executes the ICC color conversion on all the RGB coordinate values constituting the largest coordinate value group (first group), to thereby generate the first determination data DD1 (S414). The printer 10 also executes the table color conversion on all the RGB coordinate values constituting the largest coordinate value group (first group), to thereby generate the second determination data DD2 (S416). The printer 10 calculates a color difference index value indicating a color difference between the first and second determination data DD1 and DD2 (S418), and compares the color difference index value and the threshold value (S420). The number of RGB coordinate values constituting the largest coordinate value group is normally smaller than the number of pixels of the object data OD1. For this reason, the printer 10 can calculate the color difference index value promptly, in comparison with the configuration, in which the ICC color conversion and the table color conversion are executed on all the pixels in the object data OD1, and a color difference index value is calculated. For this reason, the printer 10 can promptly determine whether or not the input profile IP1 is appropriate. In particular, the largest coordinate value group is such a color range that appears most frequently in the target object data. Accordingly, the printer 10 can make an appropriate determination in order to correctly output colors in the most-frequently-appearing color range.

When it is determined that the color difference index value is larger than or equal to the threshold value (YES in S420), that is, when it is determined that the input profile IP1 is appropriate, the printer 10 executes the ICC color conversion on the object data OD1 to generate the first CMYK image data CD1 (S430). In this manner, the printer 10 can print a high-quality image.

On the other hand, when it is determined that the color difference index value is smaller than the threshold value (NO in S420), that is, when it is determined that the input profile IP1 is unsuitable, the printer 10 executes the table color conversion on the object data OD1 to generate the second CMYK image data CD2 (S435). In this manner, the printer 10 can print a high-quality image.

The printer 10 determines whether or not the input profile IP1 is appropriate on the basis of both the input profile IP1 and the object data OD1 (S420). In particular, the printer 10 determines whether or not the input profile IP1 is appropriate on the basis of a result of the color conversion processing using the input profile IP1 (that is, the first determination data DD1) (S420). For this reason, the printer 10 can appropriately determine whether or not the input profile IP1 is appropriate.

Correspondence Relationships

The processing of S414 is an example of "target color conversion processing". All RGB coordinate values in the largest coordinate value group are an example of "M number of pixels" and "target data".

Variation of Fourth Embodiment

In S414 and S416 in FIG. 9, the CPU 32 executes the ICC color conversion and the table color conversion on all the RGB coordinate values belonging to the largest coordinate value group, to thereby generate the first and second determination data. However, in S414, the CPU 32 may generate the first determination data, by executing the ICC color conversion on only part of the RGB coordinate values belonging to the largest coordinate value group. In this case, in S416, the CPU 32 generates the second determination data, by executing the table color conversion on the same part of the RGB coordinate values on which the ICC color conversion was executed in S414. According to the present variation, the printer 10 can calculate the color difference index value more promptly. In the present variation, the part of the RGB coordinate values is an example of "M number of pixels" and "target data".

Fifth Embodiment; FIG. 11

In a fifth embodiment, the CPU 32 executes a processing shown in FIG. 11 in the color conversion processing of S30 (FIG. 3). The process of S500 is the same as the process of S100 in FIG. 4. When the judgment in S500 is positive, the processing proceeds to S510. When the judgment in S500 is negative, the processing proceeds to S540.

In S510, the CPU 32 executes the ICC color conversion on all of the plurality of RGB coordinate values in the prescribed table PT to generate a plurality of CMYK coordinate values. In S512, the CPU 32 generates a correspondence table CT, in which the plurality of RGB coordinate values in the prescribed table PT and the plurality of CMYK coordinate values generated in S510 are associated with each other. In S514, the CPU 32 calculates a color difference index value indicating a color difference between the plurality of CMYK coordinate values in the prescribed table PT and the plurality of CMYK coordinate values in the correspondence table CT generated in S512. More specifically, the CPU 32 calculates a color difference index value by calculating the sum of a plurality of distances between the CMYK coordinate values in the prescribed table PT and the CMYK coordinate values in the correspondence table CT, and dividing the sum of the plurality of distances by the number of CMYK coordinate values in the prescribed table PT (that is, the number of CMYK coordinate values in the correspondence table CT), in a similar manner as in S214 in FIG. 5.

In S520, the CPU 32 determines whether or not the color difference index value calculated in S514 is larger than or equal to a threshold value. When it is determined that the color difference index value is larger than or equal to the threshold value (YES in S520), in S530 the CPU 32 executes the ICC color conversion on the target object data using the correspondence table CT generated in S512, thereby generating the first CMYK image data. On the other hand, when it is determined that the color difference index value is smaller than the threshold value (NO in S520), in S540 the CPU 32 executes a processing the same as that in S140 in FIG. 4, thereby generating the second CMYK image data. When the process of S530 or S540 is completed, the processing of FIG. 11 is ended.

Example of Processing Flow

Next will be described a specific example of the processing in FIG. 11.

The printer 10 executes the ICC color conversion on all of the RGB coordinate values in the prescribed table PT by using the input profile IP1 and the output profiles OP1 and OP2, to thereby generate CMYK coordinate values (S510). The printer 10 generates the correspondence table CT in which the RGB coordinate values and the CMYK coordinate values are associated with each other (S512). The printer 10 calculates a color difference index value indicating a color difference between the CMYK coordinate values in the prescribed table PT and the CMYK coordinate values in the correspondence table CT (S514), and compares the color difference index value and a threshold value (S520). In this way, in the present embodiment, the printer 10 determines whether or not the input profile IP1 is appropriate, without using the object data OD1. Accordingly, the determination can be made promptly.

When it is determined that the color difference index value is larger than or equal to the threshold value (YES in S520), that is, when it is determined that the input profile IP1 is appropriate, the printer 10 executes the ICC color conversion on the object data OD1 by using the correspondence table CT, to thereby generate the first CMYK image data CD1 (S530). In this manner, the printer 10 can print a high-quality image. In particular, by executing the ICC color conversion on the object data OD1 by using the correspondence table CT, it is possible to execute the ICC color conversion promptly as compared to executing the color conversion by using the input profile IP1 and the output profile OP1 and the output profile OP2 in succession.

On the other hand, when it is determined that the color difference index value is smaller than the threshold value (NO in S520), that is, when it is determined that the input profile IP1 is unsuitable, the printer 10 executes the table color conversion on the object data OD1 by using the prescribed table PT, to thereby generate the second CMYK image data CD2 (S540). In this manner, the printer 10 can print a high-quality image.

The printer 10 determines whether or not the input profile IP1 is appropriate on the basis of a result of the color conversion processing using the input profile IP1 (that is, the CMYK coordinate values generated in S510) (S420). For this reason, the printer 10 can appropriately determine whether or not the input profile IP1 is appropriate.

Correspondence Relationships

The processing of S510 is an example of "target color conversion processing". All RGB coordinate values in the prescribed table PT are an example of "L number of first coordinate values" and "target data". All CMYK coordinate values in the prescribed table PT and all CMYK coordinate values in the correspondence table CT are examples of "L number of second coordinate values" and "L number of third coordinate values", respectively.

Variation of Fifth Embodiment

Instead of executing the process of S530, the CPU 32 may generate the first CMYK image data by executing the process of S210 in FIG. 5. In this case, the processing of S512 can be omitted. In particular, in the present variation, the CPU 32 does not need to execute the ICC color conversion on all the RGB coordinate values in the prescribed table PT in S510. That is, the CPU 32 executes the ICC color conversion only on part of the RGB coordinate values in the prescribed table PT to generate CMYK coordinate values. The CPU 32 then calculate a color difference index value indicating a color difference between the generated CMYK coordinate values and those CMYK coordinate values that are among the plurality of CMYK coordinate values in the prescribed table PT and are associated with the part of RGB coordinate values that are subjected to the ICC color conversion.

Figure 12:
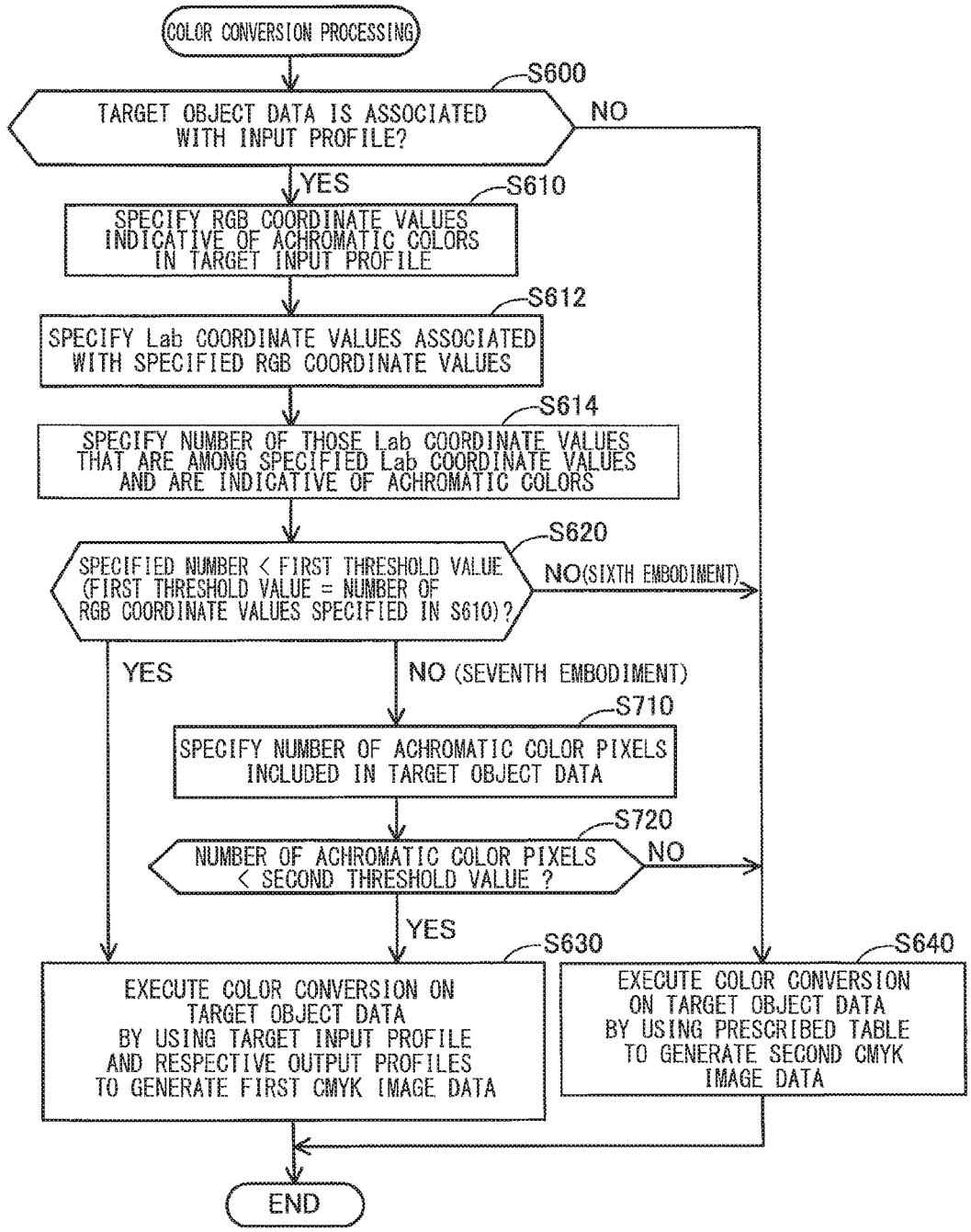
FIG. 12 illustrates a flowchart of the color conversion processing according to sixth and seventh embodiments.

Sixth Embodiment; FIG. 12

In a sixth embodiment, the CPU 32 executes a processing shown in FIG. 12 in the color conversion processing of S30 (FIG. 3). The process of S600 is the same as the process of S100 in FIG. 4. When the judgment in S600 is positive, the processing proceeds to S610. When the judgment in S600 is negative, the processing proceeds to S640.

In S610, the CPU 32 specifies, in the target input profile, those RGB coordinate values that indicate achromatic colors. More specifically, the CPU 32 specifies, among a plurality of RGB coordinate values in the target input profile, those RGB coordinate values, whose R, G, and B coordinate values are equal to one another (for example, coordinate values indicating R=G=B=0) and which indicate achromatic colors accordingly. These RGB coordinate values, whose R, G, and B coordinate values are equal to one another and therefore which indicate achromatic colors, will be referred to as "achromatic-color-indicating RGB coordinate values" hereinafter.

In S612, the CPU 32 specifies, among a plurality of Lab coordinate values in the target input profile, those Lab coordinate values that are associated with the achromatic-color-indicating RGB coordinate values specified in S610.

In S614, the CPU 32 specifies, among the Lab coordinate values specified in S612, those Lab coordinate values that indicate achromatic colors, and counts the number of the thus specified achromatic-color-indicating Lab coordinate values. More specifically, the CPU 32 specifies, among the Lab coordinate values specified in S612, those Lab coordinate values, whose a-value and b-value are equal to zero (0) and which indicate achromatic colors accordingly. The CPU 32 then specifies the number of the thus specified Lab coordinate values.

In S620, the CPU 32 determines whether or not the number specified in S614 is smaller than a first threshold value. The first threshold value is equal to the number of the achromatic-color-indicating RGB coordinate values specified in S610. That is, in S620, the CPU 32 determines whether or not the target input profile associates all the achromatic-color-indicating RGB coordinate values with those Lab coordinate values that indicate achromatic colors. When it is determined that the specified number is smaller than the first threshold value (YES in S620), it is known that the target input profile associates at least one achromatic-color-indicating RGB coordinate value with at least one Lab coordinate value that indicates chromatic color. Accordingly, in such a case, in S630, the CPU 32 executes the processing the same as that of S210 in FIG. 5, to generate the first CMYK image data.

On the other hand, when it is determined that the specified number is larger than or equal to the first threshold value (more specifically, the specified number is equal to the first threshold value; NO in S620), it is known that all of the RGB coordinate values that indicate achromatic colors are associated with those Lab coordinate values that indicate achromatic colors. In such a case, the CPU 32 executes in S640 the processing the same as that of S140 in FIG. 4, to generate the second CMYK image data. When the process of S630 or S640 is completed, the processing of FIG. 12 is ended.

When the target input profile associates at least one achromatic-color-indicating RGB coordinate value with an Lab coordinate value indicating chromatic color (YES in S620), it is known that the target input profile has such data that converts achromatic color to chromatic color. In other words, it is known that the achromatic color axis of the target input profile is shifted. It is therefore known that if the ICC color conversion is not executed on the target object data, there is high possibility that achromatic colors defined in the target object data will not be correctly output. On the other hand, if the ICC color conversion is executed on the target object data, it is highly likely that achromatic colors in the target object data will be correctly output. Accordingly, when the judgment in S620 becomes positive, that is, when it is determined that the target input profile is appropriate, the printer 10 executes the ICC color conversion on the target object data to generate the first CMYK image data (S630). In this manner, the printer 10 can print a high-quality image.

On the other hand, when all of the achromatic-color-indicating RGB coordinate values are associated with Lab coordinate values indicating achromatic colors in the target input profile (NO in S620), it is known that the achromatic color axis of the target input profile is not shifted. It is noted that the achromatic color axis of the prescribed table PT is not shifted, either. It is therefore known that even if the ICC color conversion is not executed on the target object data, there is high possibility that achromatic colors in the target object data will be output correctly as long as the table color conversion is executed on the target object data. Accordingly, when the judgment in S620 becomes negative, that is, when it is determined that the target input profile is unsuitable, the printer 10 executes the table color conversion on the target object data to generate the second CMYK image data (S640). In this manner, the printer 10 can execute color conversion on the target object data in S640 promptly as compared to executing the color conversion on the target object data by using the target input profile and the output profiles OP1 and OP2 in succession as in S630.

The printer 10 determines in S610-S620 whether the target input profile is appropriate, without using the target object data. The printer 10 can therefore execute the determination promptly. Especially, the printer 10 determines in S610-S620 whether the target input profile is appropriate, without executing color conversion using the target input profile. Accordingly, the printer 10 can promptly execute the determination.

Correspondence Relationships

The plurality of RGB coordinate values and plurality of Lab coordinate values in the target input profile are an example of "a plurality of reference coordinate values" and "a plurality of specific coordinate values", respectively.

Variation of Sixth Embodiment

In S620, the CPU 32 may determine the first threshold value in a manner described below.

For example, the CPU 32 may determine the first threshold value by multiplying the number of the achromatic-color-indicating RGB coordinate values specified in S610 by a predetermined coefficient (for example, 0.5). Or, the CPU 32 may determine the first threshold value by subtracting a predetermined value from the number of the achromatic-color-indicating RGB coordinate values.

In another variation, for example, the CPU 32 may use, as the first threshold value, a fixed value that is determined in advance.

Seventh Embodiment; FIG. 12

The color conversion processing in a seventh embodiment is different from that of the sixth embodiment in that the processing proceeds to S710 when the determination in S620 is negative.

In S710, the CPU 32 specifies the number of achromatic color pixels included in the target object data. The achromatic color pixels are those pixels that are among the plurality of pixels in the target object data and that indicate RGB coordinate values falling in a predetermined achromatic color range. The predetermined achromatic color range is defined as such a color range that includes all the achromatic colors and further includes those chromatic colors that are close to the achromatic colors. In a variation, the predetermined achromatic color range may include only the achromatic colors, but not include those chromatic colors close to the achromatic colors.

In S720, the CPU 32 determines whether or not the number of the achromatic color pixels specified in S710 is smaller than a second threshold value. That is, the CPU 32 determines whether or not the rate, at which achromatic colors appear in the target object data, is relatively low. The second threshold value in the present embodiment is a value obtained by multiplying the number of pixels in the target object data by a predetermined percentage (for example, 50%). In a variation, however, the second threshold value may be a fixed value that is determined in advance. When the number of the achromatic color pixels is smaller than the second threshold value (YES in S720), that is, the rate, at which achromatic colors appear in the target object data, is relatively low, the CPU 32 proceeds to S630. When the rate, at which achromatic colors appear in the target object data, is relatively low (YES in S720), it is known that relatively many chromatic colors appear in the target object data. In this case, it is preferable to execute the ICC color conversion on the target object data, in order to output the chromatic colors correctly. Accordingly, when the judgement in S720 is positive, that is, when it is determined that the target input profile is appropriate, the printer 10 executes the ICC color conversion on the target object data to generate the first CMYK image data (S630). In this manner, the printer 10 can print a high-quality image.

On the other hand, when the number of the achromatic pixels is larger than or equal to the second threshold value (NO in S720), that is, the rate at which achromatic colors appear in the target object data is relatively high, the CPU 32 proceeds to S640. When the rate, at which achromatic colors appear in the target objet data, is relatively high (NO in S720), it is known that chromatic colors do not appear frequently in the target object data, and therefore the need for executing the ICC color conversion is relatively low. Accordingly, when the judgment in S720 becomes negative, that is, when it is determined that the target input profile is unsuitable, the printer 10 executes the table color conversion on the target object data to generate the second CMYK image data (S640). In this manner, the printer 10 can promptly execute the color conversion.

While the description has been made in detail with reference to specific embodiments thereof, it would be apparent to those skilled in the art that various changes and modifications may be made therein without departing from the spirit and scope of the above described aspects.

First Variation

In the above-described embodiments, the CPU 32 acquires the PDF file 100 from the terminal device 50 through the network interface 16. Instead, for example, the CPU 32 may acquire the PDF file 100 from a memory device through a memory interface in which the memory device is mounted in a removable manner. In a case where a PC, in place of the printer 10, is an example of the "image processing apparatus," the CPU of the PC may acquire the PDF file 100 by reading out the PDF file 100 from a memory of the PC.

Second Variation

The memory 34 may store, in place of the first and second output profiles OP1 and OP2, a single output profile that includes data for converting coordinate values defined in the Lab color space into coordinate values defined in the CMYK color space. In this case, the CPU 32 executes the ICC color conversion by using the target input profile and the single output profile. In the present variation, the single output profile is an example of the "output-side profile".

Third Variation

In a case where the CPU 32 generates RGB image data including a plurality of pixels indicative of coordinate values defined in the RGB color space which is the standard color space, the CPU 32 may supply the RGB image data to the display section 14 so that an image expressed by the RGB image data is displayed on the display section 14. In the present variation, the display section 14 is an example of the "output device". The RGB color space which is the standard color space is an example of the "second color space".

Fourth Variation

The CPU 32 may combine the above-described embodiments in order to determine whether the target input profile is appropriate. For example, the CPU 32 may execute the processes of S600 to S620 in FIG. 12, and execute the process of S640 when the judgment in S620 is negative, or execute the processes of S110 to S140 in FIG. 4 when the judgment in S620 is positive. In this case, the process of S620 in FIG. 12 and the process of S120 in FIG. 4 are an example of "executing a judgment". When combining the several embodiments, it is preferable to execute the plural judgment processes such that a judgment process having a higher processing load will be executed after a judgment process with a lower processing load is executed. For example, the processes in the third and fourth embodiments have comparatively low processing loads because those processes employ the concept of the coordinate value groups. Accordingly, for example, the CPU 32 may execute the processes of S400 to S420 of the fourth embodiment in FIG. 9, and execute the process of S435 when the judgment in S420 is negative, and execute the processes of S110 to S140 in FIG. 4 of the first embodiment when the judgement in S420 is positive.

Fifth Variation

The CPU 32 may execute the processing the same as that in each of the above-described embodiments when the CPU 32 acquires a file in a format other than a PDF file (JPEG, for example). That is, the "target file" may be a file of any format as long as the format includes object data and an input-side profile.

Sixth Variation

The "image processing apparatus" does not need to be the printer 10, but may be another apparatus such as a PC, a server, and a portable terminal. For example, a PC may generate print data by executing a processing similar to those in the above-described embodiments, and transmit the print data to a printer. In this case, the printer is an example of the "output device".

Seventh Variation

The entire processing in each of the above-described embodiments does not need to be executed by the CPU 32, but may be executed by devices other than the CPU. For example, the CPU 32 may transmit the PDF file 100 to a first server, after executing the process of S10 in FIG. 3. In this case, the first server executes the processes of S20 to S50 in FIG. 3, and transmits print data to the printer 10. Then, the CPU 32 in the printer 10 executes the process of S60. In the present variation, a combination of the printer 10 and the first server is an example of "image processing apparatus".

In another variation, the first server executes the processes of S20 to S40, and a second server configured separately from the first sever may execute the process of S50. In this variation, a combination of the printer 10 and the first and second servers is an example of "image processing apparatus".

Eighth Variation

In each of the above-described embodiments, the CPU 32 performs the entire part of the processing shown in the corresponding figure (FIGS. 2 to 12) by executing the programs 36. Instead, in each embodiment, at least part the processing may be performed by hardware, such as a logic circuit.

What is claimed is:

1. An image processing apparatus comprising:
a memory configured to store prescribed data and an output-side profile, the prescribed data to be used for converting coordinate values defined in an input-side color space into coordinate values defined in an output-side color space, the output-side profile containing data to be used for converting coordinate values defined in a specific color space into coordinate values defined in the output-side color space; and
a control device configured to perform:
acquiring a target file in a state that the prescribed data and the output-side profile are stored in the memory, the target file including object data and an input-side profile corresponding to the object data, the object data including a plurality of pixels indicative of coordinate values defined in the input-side color space, the input-side profile including data to be used for converting the coordinate values of the pixels, which are indicated by the object data and are defined in the input-side color space into coordinate values defined in the specific color space;
executing a color conversion process onto the object data to generate post-conversion data, the post-conversion data including a plurality of pixels indicative of coordinate values defined in the output-side color space, the executing the color conversion process including identifying, based on the input-side profile, a type of post-conversion data to be used to output an image represented by the object data by determining which of a first type post-conversion data and a second type post-conversion data should be used to output the image represented by the object data, the first type post-conversion data being such data that is generated through a first type color conversion process, the second type post-conversion data being such data that is generated through a second type color conversion process, the first type color conversion process being a color conversion that uses the input-side profile and the output-side profile, and the second type color conversion process being a color conversion that uses the prescribed data; and
controlling an output device to output the image represented by the object data based on the generated post-conversion data.

2. The image processing apparatus according to claim 1, wherein identifying the type of post-conversion data to be used is executed based on both of the input-side profile and the object data.

3. The image processing apparatus according to claim 1, wherein the executing the color conversion process further includes:
executing a target color conversion process on target data by using the input-side profile,
wherein identifying the type of post-conversion data to be used is executed based on a result of the execution of the target color conversion process.

4. The image processing apparatus according to claim 3,
wherein the first type color conversion process includes an input-side color conversion process that uses the input-side profile,
wherein the target data is the object data,
wherein executing the target color conversion process on the target data includes executing the input-side color conversion process on the object data, thereby generating intermediate data including a plurality of pixels indicative of coordinate values defined in the specific color space,
wherein identifying the type of post-conversion data to be used includes determining whether a number of non-reproducible pixels is smaller than a threshold value, the non-reproducible pixels being those pixels that are among the plurality of pixels included in the intermediate data and are indicative of such coordinate values that are out of a reproducible range of the image processing apparatus,
wherein it is determined that the first type post-conversion data should be used in a case where the number of non-reproducible pixels is smaller than the threshold value, and
wherein it is determined that the second type post-conversion data should be used in a case where the number of non-reproducible pixels is greater than or equal to the threshold value.

5. The image processing apparatus according to claim 4,
wherein the first type color conversion process further includes an output-side color conversion process that uses the output-side profile, and
wherein executing the color conversion process further includes:
in a case where it is determined that the first type post-conversion data should be used, executing the output-side color conversion process onto the intermediate data, thereby generating the first type post-conversion data; and
in a case where it is determined that the second type post-conversion data should be used, executing the second type color conversion process onto the object data using the prescribed data, thereby generating the second type post-conversion data.

6. The image processing apparatus according to claim 3,
wherein the target data is N1 number of pixels from among the plurality of pixels included in the object data, wherein N1 is an integer greater than or equal to one (1),
wherein executing the target color conversion process on the target data includes executing the first type color conversion process on the target data by using both of the input-side profile and the output-side profile, thereby generating first determination data including N1 number of pixels indicative of coordinate values defined in the output-side color space,
Wherein executing the color conversion process further includes:
executing the second type color conversion process on the target data by using the prescribed data, thereby generating second determination data including N1 number of pixels indicative of coordinate values defined in the output-side color space; and
calculating a color difference index value indicative of a color difference between the N1 number of pixels included in the first determination data and the N1 number of pixels included in the second determination data,
wherein identifying the type of post-conversion data to be used includes determining whether the color difference index value is greater than or equal to a threshold value,
wherein it is determined that the first type post-conversion data should be used in a case where the color difference index value is greater than or equal to the threshold value, and it is determined that the second type post-conversion data should be used in a case where the color difference index value is smaller than the threshold value.

7. The image processing apparatus according to claim 6, wherein the N1 number of pixels included in the target data are all of the plurality of pixels included in the object data, the first determination data being the first type post-conversion data, and the second determination data being the second type post-conversion data.

8. The image processing apparatus according to claim 6,
wherein a plurality of coordinate value groups are defined in the input-side color space,
wherein executing the color conversion process further includes:
  calculating a number of group pixels for each coordinate value group, the group pixels for each coordinate value group being defined as those pixels that are included in the object data and belong to the each coordinate value group; and
  selecting a largest coordinate value group that has a largest number of group pixels among the plurality of coordinate value groups, and
  wherein the N1 number of pixels included in the target data are those pixels that are among the plurality of pixels included in the object data and belong to the largest coordinate value group.

9. The image processing apparatus according to claim 8, wherein executing the color conversion process further includes:
  in a case where it is determined that the first type post-conversion data should be used, executing the first type color conversion process onto N2 number of pixels by using both of the input-side profile and the output-side profile, to generate first partial data, thereby generating the first type post-conversion data that includes both of the first determination data and the first partial data, the N2 number of pixels being among the plurality of pixels included in the object data and being other than the N1 number of pixels, N2 being an integer greater than or equal to one (1); and
  in a case where it is determined that the second type post-conversion data should be used, executing the second type color conversion process onto the N2 number of pixels using the prescribed data, to generate second partial data, thereby generating the second type post-conversion data that includes both of the second determination data and the second partial data.

10. The image processing apparatus according to claim 3,
wherein a plurality of coordinate value groups are defined in the input-side color space, each coordinate value group being constituted from a plurality of coordinate values defined in the input-side color space,
wherein executing the color conversion process further includes:
  calculating a number of group pixels for each coordinate value group, the group pixels for each coordinate value group being defined as those pixels that are included in the object data and belong to the each coordinate value group; and
  selecting a largest coordinate value group that has a largest number of group pixels among the plurality of coordinate value groups,
wherein the target data is M number of coordinate values that are among the coordinate values constituting the largest coordinate value group, wherein M is an integer greater than or equal to one (1),
wherein executing the target color conversion process on the target data includes executing the first type color conversion process on the target data by using both of the input-side profile and the output-side profile, thereby generating first determination data including M number of coordinate values defined in the output-side color space,
wherein executing the color conversion process further includes:
executing the second type color conversion process on the target data by using the prescribed data, thereby generating second determination data including M number of coordinate values defined in the output-side color space; and
calculating a color difference index value indicative of a color difference between the M number of coordinate values included in the first determination data and the M number of coordinate values included in the second determination data,
wherein identifying the type of post-conversion data to be used includes whether the color difference index value is greater than or equal to a threshold value,
wherein it is determined that the first type post-conversion data should be used in a case where the color difference index value is greater than or equal to the threshold value, and
it is determined that the second type post-conversion data should be used in a case where the color difference index value is smaller than the threshold value.

11. The image processing apparatus according to claim 3,
wherein the prescribed data includes data in which a plurality of first coordinate values defined in the input-side color space and a plurality of second coordinate values defined in the output-side color space are associated with each other,
wherein the target data is L number of first coordinate values that are among the first coordinate values included in the prescribed data, wherein L is an integer greater than or equal to one (1),
wherein executing the target color conversion process on the target data includes executing the first type color conversion process on the target data by using both of the input-side profile and the output-side profile, thereby generating L number of third coordinate values defined in the output-side color space,
wherein executing the color conversion process further includes:
calculating a color difference index value indicative of a color difference between L number of second coordinate values and the L number of third coordinate values, the L number of second coordinate values being among the plurality of second coordinate values included in the prescribed data and are associated with the L number of first coordinate values,
wherein identifying the type of post-conversion data to be used includes determining whether the color difference index value is greater than or equal to a threshold value,
  wherein it is determined that the first type post-conversion data should be used in a case where the color difference index value is greater than or equal to the threshold value, and
  it is determined that the second type post-conversion data should be used in a case where the color difference index value is smaller than the threshold value.

12. The image processing apparatus according to claim 11, wherein the L number of first coordinate values are all of the plurality of first coordinate values included in the prescribed data, and the L number of second coordinate values are all of the plurality of second coordinate values included in the prescribed data, wherein executing the color conversion process further includes:

generating a correspondence table in which the L number of first coordinate values and the L number of third coordinate values are associated; and in a case where it is determined that the first type post-conversion data should be used, executing the first type color conversion process onto the object data by using the correspondence table, thereby generating the first type post-conversion data; and in a case where it is determined that the second type post-conversion data should be used, executing the second type color conversion process onto the object data, thereby generating the second type post-conversion data.

13. The image processing apparatus according to claim 1, wherein the input-side profile includes data in which a plurality of reference coordinate values defined in the input-side color space and a plurality of specific coordinate values defined in the specific color space are associated with each other, wherein executing the color conversion process further includes:

specifying at least one reference coordinate value indicative of achromatic color from among the plurality of reference coordinate values included in the input-side profile; and specifying at least one specific coordinate value that is associated with the specified at least one reference coordinate value from among the plurality of specific coordinate values included in the input-side profile, wherein identifying the type of post-conversion data to be used includes determining whether a number of achromatic coordinate value is smaller than a first threshold value, the achromatic coordinate value being among the specified at least one specific coordinate value and indicating achromatic color, wherein it is determined that the first type post-conversion data should be used in a case where the number of achromatic coordinate value is smaller than the first threshold value, and wherein it is determined that the second type post-conversion data should be used in a case where the number of the achromatic coordinate value is greater than or equal to the first threshold value.

14. The image processing apparatus according to claim 13, wherein executing the color conversion process further includes:

specifying a number of achromatic color pixels, which are among the plurality of pixels included in the object data and are indicative of coordinate values falling within a prescribed achromatic color range, identifying the type of post-conversion data to be used includes determining whether the number of the achromatic coordinate value is greater than or equal to the first threshold value and whether a number of the achromatic color pixels is smaller than a second threshold, and wherein it is determined that the first type post-conversion data should be used in a case where the number of the achromatic coordinate value is greater than or equal to the first threshold value and the number of the achromatic color pixels is smaller than the second threshold, and wherein it is determined that the second type post-conversion data should be used in a case where the number of the achromatic coordinate value is greater than or equal to the first threshold value and the number of the achromatic color pixels is greater than or equal to the second threshold.

15. The image processing apparatus according to claim 1, wherein the target file includes a plurality of object data and a plurality of input-side profiles, each object data corresponding to one of the input-side profiles, wherein each input-side profile includes data to be used for converting the coordinate values of the pixels, which are indicated by the corresponding object data and are defined in the input-side color space, into coordinate values defined in the specific color space, wherein a type of a post-conversion data to be used to output an image represented by each object data is identified based on the corresponding input-side profile, and wherein the output device is controlled to output the images represented by the plurality of object data in the target file based on the post-conversion data generated for the plurality of object data.

16. A non-transitory computer readable storage medium storing a set of program instructions for an image processing apparatus, the image processing apparatus including: a memory configured to store prescribed data and an output-side profile, the prescribed data being to be used for converting coordinate values defined in a input-side color space into coordinate values defined in a output-side color space, the output-side profile containing data to be used for converting coordinate values defined in a specific color space into coordinate values defined in the output-side color space; and a computer, the program instructions, when executed by the computer, causing the image processing apparatus to perform:

acquiring a target file in a state that the prescribed data and the output-side profile are stored in the memory, the target file including object data and an input-side profile corresponding to the object data, the object data including a plurality of pixels indicative of coordinate values defined in the input-side color space, the input-side profile including data to be used for converting the coordinate values of the pixels, which are indicated by the object data and are defined in the input-side color space into coordinate values defined in the specific color space;

executing a color conversion process onto the object data to generate post-conversion data, the post-conversion data including a plurality of pixels indicative of coordinate values defined in the output-side color space, the executing the color conversion process including identifying, based on the input-side profile, a type of post-conversion data to be used to output an image represented by the object data by determining which of a first type post-conversion data and a second type post-conversion data should be used to output the image represented by the object data, the first type post-conversion data being such data that is generated through a first type color conversion process, the second type post-conversion data-being such data that is generated through a second type color conversion process, the first type color conversion process being a color conversion that uses the input-side profile and the output-side profile, and the second type color conversion process being a color conversion that uses the prescribed data; and controlling an output device to output the image represented by the object data based on the generated post-conversion data.

* * * * *

UNITED STATES PATENT AND TRADEMARK OFFICE
CERTIFICATE OF CORRECTION

PATENT NO. : 10,313,561 B2
APPLICATION NO. : 15/404240
DATED : June 4, 2019
INVENTOR(S) : Kazuhide Sawada Page 1 of 1

It is certified that error appears in the above-identified patent and that said Letters Patent is hereby corrected as shown below:

In the Claims

Column 30, Claim 16, Line 49 should read:
defined in the input-side color space, into coordinate Signed and Sealed this
Sixth Day of August, 2019

Andrei Iancu
*Director of the United States Patent and Trademark Office*